(12) United States Patent
Ikenishi et al.

(10) Patent No.: US 9,656,905 B2
(45) Date of Patent: May 23, 2017

(54) FLUOROPHOSPHATE GLASS AND METHOD FOR PRODUCING THE SAME AND NEAR-INFRARED ABSORBING FILTER

(75) Inventors: Mikio Ikenishi, Shinjuku-ku (JP); Yoshitake Tanno, Shinjuku-ku (JP)

(73) Assignee: HOYA CORPORATION, Tokyo (JP)

( * ) Notice: Subject to any disclaimer, the term of this patent is extended or adjusted under 35 U.S.C. 154(b) by 393 days.

(21) Appl. No.: 13/571,578

(22) Filed: Aug. 10, 2012

(65) Prior Publication Data
US 2013/0207057 A1    Aug. 15, 2013

(30) Foreign Application Priority Data

Aug. 11, 2011 (JP) ................................ 2011-176017
Jul. 26, 2012 (JP) ................................ 2012-165430

(51) Int. Cl.
| | |
|---|---|
| *F21V 9/04* | (2006.01) |
| *F21V 9/06* | (2006.01) |
| *G02B 5/22* | (2006.01) |
| *G02B 5/26* | (2006.01) |
| *C03C 3/247* | (2006.01) |

(Continued)

(52) U.S. Cl.
CPC .............. *C03C 4/082* (2013.01); *C03C 3/247* (2013.01); *C03C 3/325* (2013.01)

(58) Field of Classification Search
USPC .............. 65/61, 66, 102, 122, 126; 252/587; 264/1.23; 501/44, 48
See application file for complete search history.

(56) References Cited

U.S. PATENT DOCUMENTS

2004/0082460 A1*  4/2004  Yamane et al. ................. 501/48
2006/0223689 A1* 10/2006  Ikenishi .................. C03C 3/247
                                                                501/45

(Continued)

FOREIGN PATENT DOCUMENTS

| CN | 1927751 A | 3/2007 |
|---|---|---|
| JP | 01-219073 A | 9/1989 |

(Continued)

OTHER PUBLICATIONS

Communication dated May 20, 2014 from the Japanese Patent Office in counterpart of Japanese application No. 2012-165430.

*Primary Examiner* — Bijan Ahvazi
(74) *Attorney, Agent, or Firm* — Sughrue Mion, PLLC

(57) ABSTRACT

To provide a fluorophosphates glass having a weather-resistant property and having an $O^{2-}/P^{5+}$ ratio even after production, which is set so that $Cu^{2+}$ can be added with a quantity of such a degree suppressing an absorption of a visible light while absorbing a near-infrared light, and a method for producing the same, and a near-infrared light absorbing filter, wherein a molar ratio of a content of $O^{2-}$ with respect to a content of $P^{5+}$ ($O^{2-}/P^{5+}$) in the fluorophosphates glass, is 3.2 or more and less than 3.4, and a molar ratio of a content of $F^-$ with respect to a total content of $O^{2-}$ and $F^-$ ($F^-/(O^{2-}+F^-)$) in the fluorophosphates glass is 0.05 or more and 0.25 or less.

8 Claims, 6 Drawing Sheets

(51) Int. Cl.
    *C03C 4/08*    (2006.01)
    *C03C 3/32*    (2006.01)

(56)        References Cited

U.S. PATENT DOCUMENTS

2010/0113247 A1*  5/2010  Ikenishi .................. C03B 11/12
                                                         501/44
2012/0165178 A1   6/2012  Ritter et al.
2013/0135714 A1   5/2013  Kondo et al.

FOREIGN PATENT DOCUMENTS

| JP | 03-083834 A  |   | 4/1991  |        |          |
|----|--------------|---|---------|--------|----------|
| JP | 03-232735 A  |   | 10/1991 |        |          |
| JP | 4214043 A    |   | 8/1992  |        |          |
| JP | 06-016451 A  |   | 1/1994  |        |          |
| JP | 08-253341 A  |   | 10/1996 |        |          |
| JP | 10-139454 A  |   | 5/1998  |        |          |
| JP | 200483290 A  |   | 3/2004  |        |          |
| JP | 2005-353718  | * | 12/2005 | ...... | H01L 23/02 |
| JP | 2005353718 A |   | 12/2005 |        |          |
| JP | 2010-059019 A|   | 3/2010  |        |          |
| JP | 2010-059021 A|   | 3/2010  |        |          |
| JP | 2010-059022 A|   | 3/2010  |        |          |
| JP | 2010-059023 A|   | 3/2010  |        |          |
| JP | 2011-093757 A|   | 5/2011  |        |          |
| JP | 2011-132077 A|   | 7/2011  |        |          |
| JP | 2012-148964 A|   | 8/2012  |        |          |
| WO | 2012/018026 A1|  | 2/2012  |        |          |

* cited by examiner

FIG.1

| | $O^{2-}/P^{5+}$ RATIO | $F^-$ RATIO | REMARKS |
|---|---|---|---|
| EX. 3 OF PATENT DOCUMENT 2 | 3.473744 | 0.006025 | Pb IS CONTAINED |
| COM. EX. 11 OF PATENT DOCUMENT 2 | 3.068565 | — | $B^{3+}$ IS CONTAINED, $F^-$ IS NOT CONTAINED |
| COM. EX. 12 OF PATENT DOCUMENT 2 | 3.182688 | — | $F^-$ IS NOT CONTAINED |
| EX. 1 OF PATENT DOCUMENT 3 | 3.134901 | 0.661544 | — |
| EX. 7 OF PATENT DOCUMENT 3 | 3.149881 | 0.733764 | — |
| EX. 8 OF PATENT DOCUMENT 3 | 3.079777 | 0.337624 | — |
| EX. 11 OF PATENT DOCUMENT 3 | 3.260386 | 0.467068 | — |
| EX. 18 OF PATENT DOCUMENT 3 | 3.394710 | 0.444594 | — |
| COM. EX. 25 OF PATENT DOCUMENT 3 | 3.020058 | 0.405389 | — |
| EX. 2 OF PATENT DOCUMENT 5 | 3.031390 | 0.215221 | Pb IS CONTAINED |
| EX. 5 OF PATENT DOCUMENT 5 | 3.480060 | 0.484436 | — |
| EX. 8 OF PATENT DOCUMENT 5 | 3.461567 | 0.558856 | — |
| EX. 9 OF PATENT DOCUMENT 5 | 3.237104 | 0.609943 | — |
| EX. 10 OF PATENT DOCUMENT 5 | 3.359127 | 0.275487 | Pb IS CONTAINED |
| EX. 1 OF PATENT DOCUMENT 6 | 3.363245 | 0.343490 | — |
| EX. 3 OF PATENT DOCUMENT 6 | 3.011756 | 0.191647 | Pb IS CONTAINED |
| EX. 5 OF PATENT DOCUMENT 6 | 3.432149 | 0.541318 | Pb IS CONTAINED |
| EX. 6 OF PATENT DOCUMENT 6 | 3.404429 | 0.375737 | — |
| EX. 7 OF PATENT DOCUMENT 6 | 3.128491 | 0.292533 | Pb IS CONTAINED |
| EX. 8 OF PATENT DOCUMENT 6 | 3.363245 | 0.338950 | — |
| EX. 9 OF PATENT DOCUMENT 6 | 3.324640 | 0.405765 | Pb IS CONTAINED |
| EX. 10 OF PATENT DOCUMENT 6 | 3.322762 | 0.400466 | — |

EX. = EXAMPLE     COM. EX. = COMPARATIVE EXAMPLE

FIG. 4
(a)
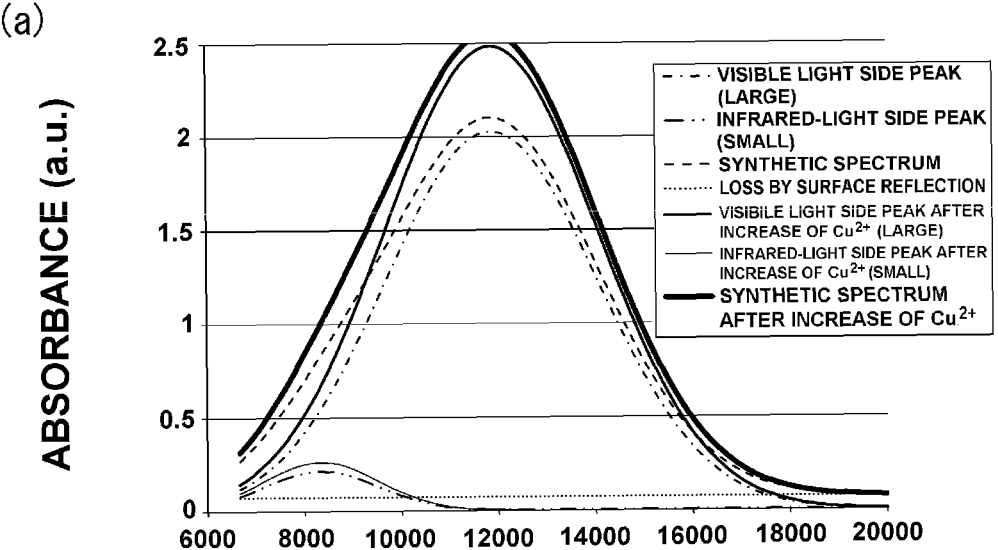
(b)
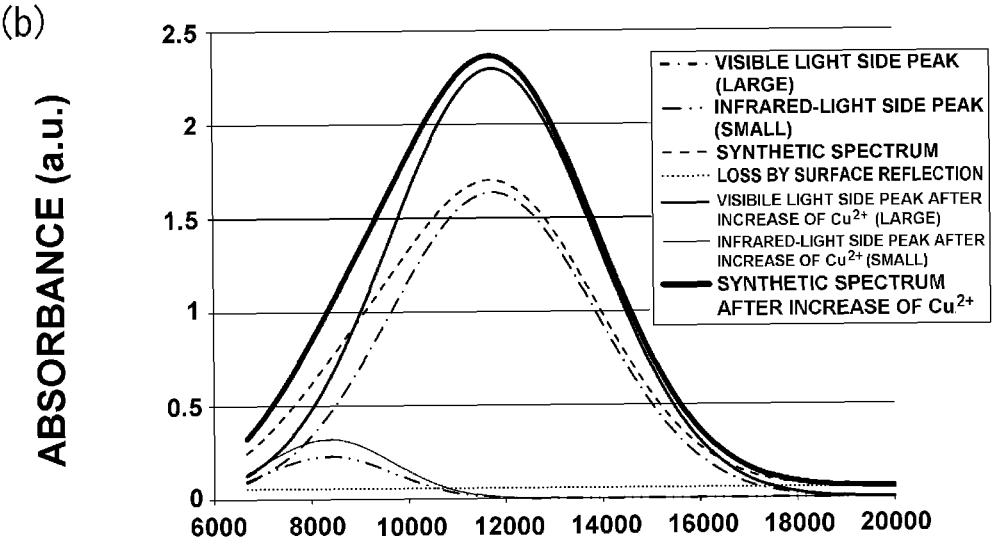

FIG.5
(a)
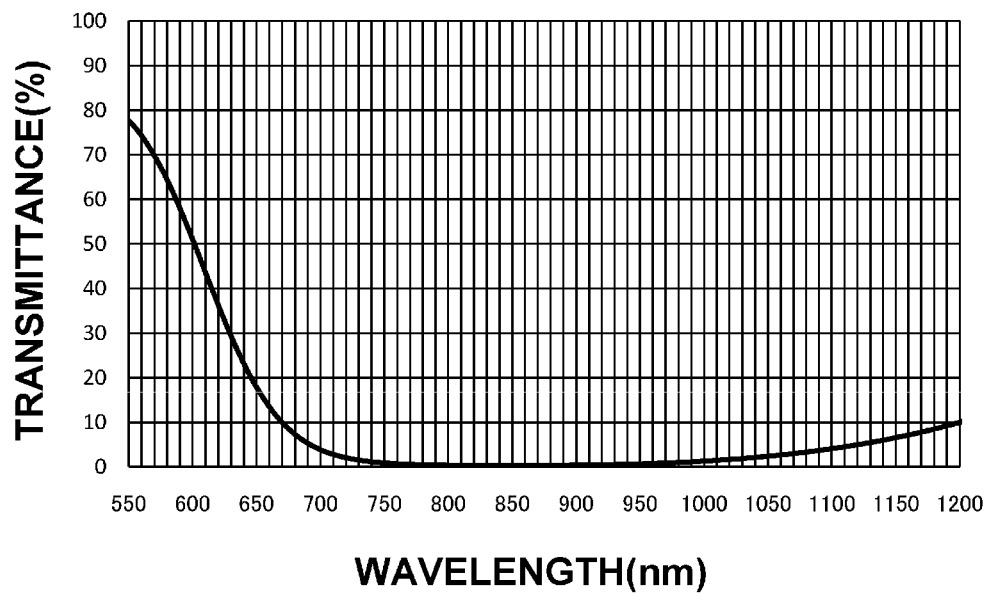
(b)
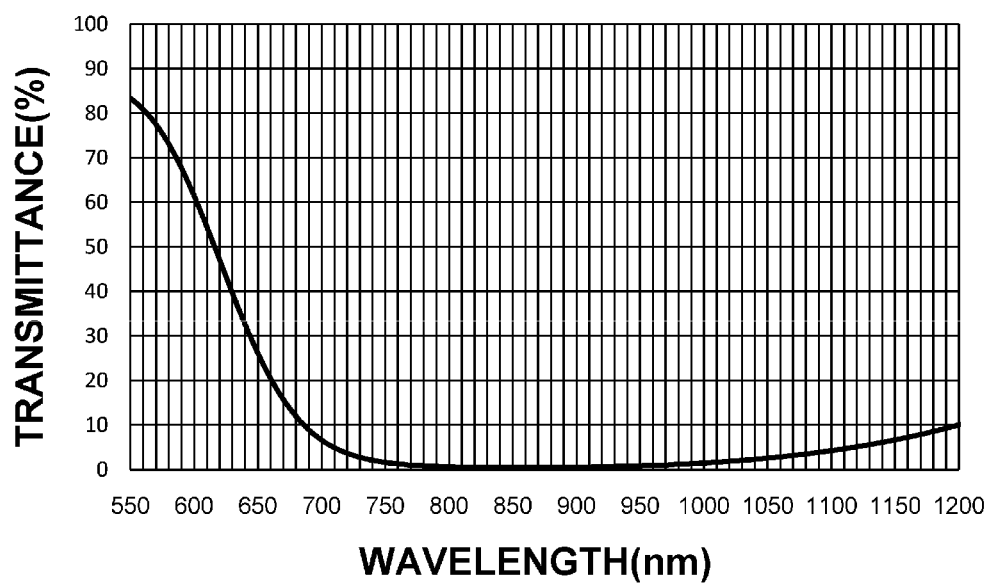

FLUOROPHOSPHATE GLASS AND METHOD FOR PRODUCING THE SAME AND NEAR-INFRARED ABSORBING FILTER

The present application is based on Japanese Patent Applications, No. 2011-176017 and 2012-165430 filed on Aug. 11, 2011 and Jul. 26, 2012, the entire contents of which are hereby incorporated by reference.

TECHNICAL FIELD

The present invention relates to a fluorophosphates glass and a method for producing the same and a near-infrared absorbing filter, and more particularly to a fluorophosphates glass absorbing a near-infrared light and a method for producing the same and a near-infrared absorbing filter.

DESCRIPTION OF RELATED ART

The fluorophosphates glass is extremely useful as a glass having a weather-resistant property and a low dispersion glass, and such a glass includes a glass as described in patent documents 1 to 6.

When glass raw materials are prepared based on a composition capable of obtaining required optical characteristics, and are heated and melted to thereby prepare the fluorophosphates glass, usually following problems are involved.

Generally, the fluorophosphates glass exhibits a remarkable volatility during production. As an adverse influence of a volatilization of a molten glass, there are problems such as generating striae near a surface of a glass or inside thereof, and causing variation in glass properties with elapse of time because a glass composition is varied as the volatilization is advanced.

Further, phosphoryl fluoride ($POF_3$) is generated in a production process, to thereby cause the volatilization. Moreover, volatilized phosphoryl fluoride is hydrolyzed, to thereby generate hydrogen fluoride (HF), thus generating a white smoke containing $POF_3$ and HF. There is a risk of damaging glass production equipment by a compound of $POF_3$ and HF, and therefore there is a necessity for taking measures more than usual. Accordingly, a tremendous cost is required for responding to volatile by-products, and a load imposed on an operator is also increased.

In order to improve such a situation, inventors of the present invention disclose a result of examining a cause of the volatility in patent documents 7 to 10. An outline of contents thereof is as follows.

When fabricating the fluorophosphates glass, a phosphate raw material is generally used. However, in order to increase a content of introducing fluorine ions as anionic components as much as possible, metaphosphate (oxygen atoms (O)/phosphorus atoms (P)=3, namely $PO_3$) with a small ratio (oxygen atoms/phosphorus atoms) of the number of oxygen atoms with respect to one phosphorus atom, is used as phosphate. From such a reason, the ratio of the content of oxygen atoms with respect to the content of phosphorus atoms has been 3 heretofore in many cases in a fluorophosphates-based general-purpose glass.

As a result of an examination by the inventors of the present invention, it is found that when making a glass with oxygen/phosphorus ratio of 3 using metaphosphate only as an oxide raw material, phosphoryl fluoride ($POF_3$) showing a remarkable volatility is generated between a reaction in the molten glass between metaphosphoric acid and fluorine which is derived from a raw material. Meanwhile, it is also found that a generation amount of a volatile substance is drastically reduced by adding an oxide excluding the metaphosphate or adjusting an atomic ratio of oxygen atoms per one atom of phosphorus in the molten glass to 3.5 or more (oxygen atoms/phosphorus atoms≥3.5) using a pyrophosphate raw material. It seems that this is because 2 phosphoric acid (pyrophosphoric acid, namely $P_2O_7$) with oxygen atoms/phosphorus atoms being 3.5, is more stable than the metaphosphoric acid in which a ratio of oxygen atoms to phosphorus 1 atom (oxygen atoms/phosphorus atoms) is 3, as the phosphoric acid present in the molten glass.

Based on the above-described knowledge and in order to suppress the volatilization, the inventors of the present invention pay attention to a molar ratio of $O^{2-}$ content with respect to $P^{5+}$ content ($O^{2-}/P^{5+}$) in the fluorophosphates glass, and a molar ratio of a content of oxygen atoms with respect to a content of phosphorus atoms (O/P) contained in the raw materials, and achieve a technique of setting these values to 3.5 or more, and disclose this technique in patent documents 7 to 10.

Note that an applicant of the present invention also discloses the technique of setting the aforementioned molar ratio to 3.5 or more, similarly in patent document 11.

Further, the inventors of the present invention also disclose a technique of setting the molar ratio of a content of $O^{2-}$ with respect to a content of $P^{5+}$ in the fluorophosphates glass to 3.4 or more, and setting the molar ratio of a content of $F^-$ with respect to a total content $O^{2-}$ and $F^-$ in the fluorophosphates glass to 0.05 or more.

The molar ratio of a content of oxygen (also described as $O^{2-}$) with respect to a content of phosphorus (also described as $P^{5+}$) content in the fluorophosphates glass is also called "$O^{2-}/P^{5+}$ ratio", and the molar ratio of a content of oxygen (also described as O) with respect to a content of phosphorus (also described as P) contained in the raw material is also called "raw material O/P ratio" hereafter for the convenience of explanation.

Patent document 1:
Japanese Patent Laid Open Publication No. 1998-139454
Patent document 2:
Japanese Patent Laid Open Publication No. 1994-16451
Patent document 3:
Japanese Patent Laid Open Publication No. 1996-253341
Patent document 4:
Japanese Patent Laid Open Publication No. 1991-232735
Patent document 5:
Japanese Patent Laid Open Publication No. 1989-219073
Patent document 6:
Japanese Patent Laid Open Publication No. 1991-83834
Patent document 7:
Japanese Patent Laid Open Publication No. 2010-59019
Patent document 8:
Japanese Patent Laid Open Publication No. 2010-59021
Patent document 9:
Japanese Patent Laid Open Publication No. 2010-59022
Patent document 10:
Japanese Patent Laid Open Publication No. 2010-59023
Patent document 11:
Japanese Patent Laid Open Publication No. 2011-132077
Patent document 12:
Japanese Patent Laid Open Publication No. 2011-93757

A reason for setting the $O^{2-}/P^{5+}$ ratio to 3.5 or more in the patent documents 7 to 10 will be described in detail from an aspect of a mechanism, prior to description of a problem to be solved by the present invention.

It has been normal to set the $O^{2-}/P^{5+}$ ratio to 3 in the fluorophosphates-based general-purpose glass as described above before disclosure of the patent documents 7 to 10. When the $O^{2-}/P^{5+}$ ratio is 3, a long P—O—P chain is formed in a glass by coupling of O and P. A plurality of P—O—P chains are oriented and intertwined, to thereby make the fluorophosphates glass suitable for a practical use.

However, when fluorine (F) is present at the $O^{2-}/P^{5+}$ ratio of 3, there is a possibility that the coupling of O and P in the P—O—P chain is cut by F. As a result, the aforementioned volatile substance ($POF_3$ or HF) is possibly generated as a byproduct. In order to prevent such a situation, patent documents 7 to 10 use a mechanism of previously changing a metaphosphoric acid structure (namely $PO_3$) to a pyrophosphoric acid structure (namely $P_2O_7$) by cutting the P—O—P chain by O, by having higher $O^{2-}/P^{5+}$ ratio than usual (namely, by containing increased content of oxygen (O)).

Meanwhile, it is also found by the inventors of the present invention, that there is a problem that although a near-infrared light is absorbed by a C-based glass containing $Cu^{2+}$ by increasing the $O^{2-}/P^{5+}$ ratio, practicability as an optical filter is reduced due to excessively strong absorption of a visible light. More specifically, the inventors of the present invention clarifies a point as follows: when a plate-shaped fluorophosphates glass having a prescribed thickness is formed, and when $Cu^{2+}$ is added to the raw materials, with a quantity of such a degree enabling the near-infrared light to be absorbed, the visible light is excessively absorbed by increasing the $O^{2-}/P^{5+}$ ratio compared with a case that the $O^{2-}/P^{5+}$ ratio is 3, namely the visible light is excessively absorbed this time by charging $Cu^{2+}$ into the raw materials with a quantity of such a degree enabling the near-infrared light to be absorbed.

In addition, although details are described later, the inventors of the present invention obtain a knowledge as follows: excessive absorption of the visible light is influenced by the $O^{2-}/P^{5+}$ ratio, and a content of fluorine (F) in the glass needs to be taken into consideration so that the fluorophosphates glass after production has the $O^{2-}/P^{5+}$ ratio which is set for solving the above-described problems.

An object of the present invention is to provide a fluorophosphates glass, a method for producing the same, and a near-infrared light absorbing filter, having the following $O^{2-}/P^{5+}$ ratio even after production: namely the $O^{2-}/P^{5+}$ ratio being set so that $Cu^{2+}$ can be added with a quantity of such a degree suppressing an absorption of a visible light while absorbing a near-infrared light, and having a weather-resistant property.

First, the inventors of the present invention decide to follow a policy of a technique of patent documents 7 to 10 described by the inventors of the present invention. Namely, the inventors of the present invention employ the following policy: by more increasing the $O^{2-}/P^{5+}$ ratio than conventional (3.0), the volatilization of the byproduct is suppressed first. Thus, as described above, the P—O—P chain is previously cut by O, and the generation of $POF_3$ can be suppressed. Further, there is also a possibility that the P—O—P chain is cut by water molecules contained in an atmosphere in which the fluorophosphates glass is produced. Therefore, it is estimated that a weather-resistant property can also be improved by previously cutting a certain degree of P—O—O chain.

Meanwhile, when the $O^{2-}/P^{5+}$ ratio is more increased than conventional, the molar ratio of a content of $F^-$ with respect to a total content of $O^{2-}$ and $F^-$ in the fluorophosphates glass, is required to be increased. This is because since the P—O—P chain is cut by O by increasing the $O^{2-}/P^{5+}$ ratio, thus reducing a glass forming ability, resulting in a glass which is remarkably easily crystallized. Therefore, by increasing the molar ratio of the content of F— in the glass, F is interposed between pyrophosphoric acid structures, and structures with P—O—P chain cut can be coupled to each other. Thus, the fluorophosphates-based glass can be put to practical use.

The molar ratio ($F^-/(O^{2-}+F^-)$) of the content of $F^-$ with respect to the total content of oxygen (also described as $O^{2-}$) and fluorine (also described as $F^-$) ($O^{2-}+F^-$) is called "F ratio$^-$", and the molar ratio of the content of F with respect to the total content of the oxygen (also described as O) and fluorine (also described as F) (O+F) contained in the raw material is called "raw material F ratio". However, although as will be described in detail later, the present invention employs a technique of substantially not allowing the volatile substance to be generated. Therefore, the aforementioned raw material F ratio is substantially the same as the $F^-$ ratio in a product glass.

When getting back to an original point, by increasing the $O^{2-}/P^{5+}$ ratio, the P—O—P chain in the glass has the pyrophosphoric acid structure (namely $P_2O_7$) in many cases. Under such a situation, other metal in the glass (such as Li) and the pyrophosphoric acid structure are coupled to each other, and there is a possibility that a crystal is formed. Generation of the crystal results in a remarkable deterioration of optical characteristics. As a countermeasure against such a situation, F is interposed between pyrophosphoric acid structures by increasing the $F^-$ ratio in the glass. Thus, formation of the crystal can be suppressed.

Here, numerical values of the $O^{2-}/P^{5+}$ ratio exceeding 3.0, or less than 3.5 are selected in examples of patent documents 2 to 6, and the $O^{2-}/P^{5+}$ ratio and the $F^-$ ratio are listed in a table. FIG. 1 shows the table of such a list. As shown in FIG. 1, when the $O^{2-}/P^{5+}$ ratio is more increased than conventional, it is a common sense for a skilled person to usually set the $F^-$ ratio to a little less than 0.30 or more at minimum, for the purpose of having a sufficient weather-resistant property.

Note that patent document 12 describes the $O^{2-}/P^{5+}$ ratio set to 3.4 or more, and the $F^-$ ratio set to 0.05 or more. However, reduction of a spectral transmission factor (simply called a transmittance hereafter) at the time of $\lambda 50=615$ nm in a near-infrared light region (1200 nm), stays in a range of about 23% (see examples (lower table of table 1) of patent document 12). As a reason thereof, a cause and effect relationship can be considered as follows. A light in a visible light region (615 nm) is constantly absorbed→a glass thickness satisfying $\lambda 50=615$ nm is allowed to be thin→the near-infrared light cannot be sufficiently absorbed due to a thin glass thickness.

Based on the aforementioned circumstance, the above-described problems are examined by the inventors of the present invention. As a result, the following three kinds of knowledge (if being roughly divided) can be obtained, to thereby achieve the present invention.

[Knowledge 1] As a result of analyzing an absorption spectrum (horizontal axis: wave number (K(Kayser=$cm^{-1}$)), it is found that there is one peak in a wavelength range of near-infrared light to visible light. However, such a one peak can be separated into two peaks of a near-infrared light side peak and a visible light side peak. Then, intensity of the visible light side peak is influenced by the $O^{2-}/P^{5+}$ ratio.

[Knowledge 2] Even if a prescribed quantity of the raw material is mixed so that a final glass composition has a prescribed $O^{2-}/P^{5+}$ ratio, and when the $O^{2-}/P^{5+}$ ratio is set in the vicinity of 3.0 at least in a raw material stage, byproducts are volatilized in a case of a high raw material F ratio (or in a case of a high melting temperature). Therefore, the $O^{2-}/P^{5+}$ ratio is actually varied in a period from the raw material stage to a post-glass production stage. Namely, the $O^{2-}/P^{5+}$ ratio in the product glass is influenced by the raw material F ratio (or the melting temperature).

[Knowledge 3] The $O^{2-}/P^{5+}$ ratio that varies in a period from the raw material stage to the post-glass production stage according to [Knowledge 2] is about 3.3. The numerical value of 3.3 indicates a Tripoli phosphorus structure (namely $P_3O_{10}$).

A process to achieve the present invention will be systematically described hereafter, while describing the knowledge in detail respectively.

First, [Knowledge 1] will be described as follows. FIG. 2 shows a result of an analysis of the absorption spectrum performed to the fluorophosphates glass containing $Cu^{2+}$. The absorption peak in FIG. 2 can be divided into an infrared light side peak (small) where absorption is performed originally by $Cu^{2+}$, and a visible light side peak (large) positioned at more a short wavelength side (namely a high wave number side) than the infrared light side peak. The result thereof is shown in FIG. 3. Note that in FIG. 3A, the $O^{2-}/P^{5+}$ ratio is set to 3.5, and in FIG. 3B, the $O^{2-}/P^{5+}$ ratio is set to 3.18.

From FIG. 3, it is found that an absorption peak (solid line with ◇) in an actual measured spectrum is divided into the infrared light side peak (broken line) where the absorption is performed originally by $Cu^{2+}$, and the visible light side peak (solid line) positioned at more short wavelength side than the infrared light side peak. In addition, when FIG. 3A and FIG. 3B are compared, it is found that in FIG. 3B in which the $O^{2-}/P^{5+}$ ratio is lower, the intensity of the visible light side peak is low. Note that regarding a width and the intensity of the infrared light side peak, there is almost no difference between them, and regarding the width of the visible light side peak, there is almost no difference between them. Further, regarding a peak position, there is almost no difference between them.

Note that a finally obtained spectral transmission factor includes a loss by surface reflection. In order to take this loss into consideration, the loss by surface reflection (dot line) is also taken into consideration of an absorbance. However, in FIG. 3, since a variation amount of a reflectance by the variation of a refractive index is generally small, calculation is carried out based on a constant reflectance irrespective of a wavelength.

Note that the spectrum (solid line with ◇) whose measurement is performed to the product glass, approximately coincides with the spectrum (long broken line) in which the loss by surface reflection is synthesized while overlapping normal distribution spectra (namely the infrared light side peak and the visible light side peak) which are obtained by dividing the aforementioned measured spectrum into two spectra.

Here, a case of producing a plate-shaped glass is considered in consideration of a result of the glass having high $O^{2-}/P^{5+}$ ratio (FIG. 3A), and a result of the glass having low $O^{2-}/P^{5+}$ ratio (FIG. 3B), wherein the plate-shaped glass has a certain thickness and a certain near-infrared light absorption ability (more specifically, the transmittance is 10% at a wavelength of 1200 nm (about 8300K)). Namely, in order to obtain a required plate-shaped glass, $Cu^{2+}$ needs to be further added in the raw material stage to increase the intensity of the infrared light side peak in the absorption spectrum, so that the plate-shaped glass achieves 10% of transmittance in the near-infrared light region.

Thus, FIG. 4 shows a result of estimating the absorption spectrum of the fluorophosphates glass in a case of further adding $Cu^{2+}$. Then, based on FIG. 4, the transmittance of the light in the plate-shaped glass is estimated, and a result thereof is shown in FIG. 5. Note that FIG. 4A and FIG. 5A show an estimation result of FIG. 3A, and FIG. 4B and FIG. 5B show an estimation result of FIG. 3B.

As shown in FIG. 4, when $Cu^{2+}$ is further added so that the product glass has a certain near-infrared light absorption ability (transmittance is 10% at the wavelength of 1200 nm (about 8300K) (broken line→thick solid line), the intensity of the infrared light side peak is increase and also the intensity of the visible light side peak is further increased (one dot chain line→solid line). At this time, as shown in FIG. 3A, if the $O^{2-}/P^{5+}$ ratio is high, absorption at the visible light side becomes extremely strong by further adding $Cu^{2+}$, because the intensity of the visible light side peak (for example, in the vicinity of the wavelength of about 830 nm (about 12000K)) is originally high. As a result, as shown in FIG. 5A, the fluorophosphates glass has an excessive absorption ability in the visible light region (for example, at the wavelength of 500 nm), thus reducing the transmittance of the fluorophosphates glass in the visible light region.

Reversely, if the $O^{2-}/P^{5+}$ ratio is low, as shown in FIG. 3B, the intensity of the visible light side peak is originally low, and therefore even if the transmittance at the wavelength of 1200 nm (about 8300K) is set to 10% by further adding $Cu^{2+}$, the absorption at the visible light side is not strong so much. As a result, as shown in FIG. 5B, owing to the transmittance of the fluorophosphates glass, the fluorophosphates glass has a suitable absorption ability in the visible light region, and therefore a high value is maintained as the transmittance of the fluorophosphates glass in the visible light region.

From the aforementioned result, and as a result of strenuous efforts by the inventors of the present invention, a knowledge (namely [knowledge 1]) is finally obtained by fabricating the fluorophosphates glass capable of absorbing the near-infrared light, which is the knowledge showing that the $O^{2-}/P^{5+}$ ratio has an influence on whether or not the visible light is also absorbed.

Not only the [knowledge 1] but also the [knowledge 2] is obtained by the inventors of the present invention, as a result of continuing the strenuous efforts based on the [knowledge 1]. The [knowledge 2] will be described in detail hereafter.

FIG. 6 is a graph indicating a relation between the O/P ratio in the raw materials at a time point of raw materials in the fluorophosphates glass, and the transmittance after producing the fluorophosphates glass, wherein a series of each plot for each raw material F ratio is shown. Note that the melting temperature is set to 1000° C.

Note that in FIG. 6, a glass thickness is varied so that the intensity of the visible light side peak is the same in the plot for each raw material F ratio. However, compositions excluding the "raw material F ratio", "glass thickness", and "raw material O/P ratio" (for example, the other compositions such as $Cu^{2+}$) are the same.

When the raw material F ratio is 0.04 and 0.08, FIG. 6 substantiates the [knowledge 1] and clarifies a point that the intensity of the infrared light side peak is decreased (namely the transmittance is increased) due to the $O^{2-}/P^{5+}$ ratio which is higher as the O/P ratio of the raw material becomes higher in a case that the intensity of the visible light side peak is fixed at each plot. More specifically, since the intensity of the visible light side peak is restricted to be fixed at each plot, only a small content of $Cu^{2+}$ can be added due to originally high intensity of the visible light side peak, when the O/P ratio of the raw material is high (namely when the $O^{2-}/P^{5+}$ ratio is high). As a result, the intensity of the infrared light side peak is decreased, thus increasing the transmittance.

Meanwhile, when the raw material F ratio is 0.11 and 0.15, it is found that there is no difference so much in the transmittance of a final form of a glass, even if the raw materials are mixed in the raw material stage, with the O/P ratio in the raw materials varied. Namely, if the [knowledge 1] is based, a difference in compositions of the final form of the glass becomes small between the plots (for example, when the raw material O/P ratio is between point 3.05 and point 3.09 in the plot where the raw material F ratio is 0.15), namely the glass is turned into a glass having approximately the same $O^{2-}/P^{5+}$ ratio, even if the raw materials are mixed in the raw material stage, with the O/P ratio in the raw materials varied.

In order to pursuit the cause thereof, further additional experiment was performed by the inventors of the present invention. More specifically, the experiment was performed in a case of setting the raw material F ratio to 0.15 in FIG. 6, in a state that the melting temperatures are different (900° C. and 1000° C. respectively).

The result thereof is shown in FIG. 7.

FIG. 7 clarifies a point that the aforementioned tendency becomes further remarkable by increasing the melting temperature. Namely, it is found that even if the raw materials are mixed in the raw material stage with the O/P ratio in the raw materials varied by increasing the melting temperature and accelerating a reaction, the transmittance is the same when the fluorophosphates glass is turned into the product glass finally, resulting in obtaining approximately a fixed $O^{2-}/P^{5+}$ ratio.

Based on FIG. 6 and FIG. 7, the inventors of the present invention examine the cause of the aforementioned phenomenon. As a result, it is estimated that the aforementioned phenomenon is caused by a change of the glass composition from that of the raw material stage, due to the volatilization of $POF_3$. Therefore, it is estimated that higher raw material F ratio accelerates the volatilization of the $POF_3$, and finally the O/P ratio becomes close to a fixed $O^{2-}/P^{5+}$ ratio (about 3.3). It is also estimated that the volatilization of the $POF_3$ is accelerated by increasing the melting temperature, and finally the P/O ratio becomes close to the fixed $O^{2-}/P^{5+}$ ratio. Namely, the $O^{2-}/P^{5+}$ ratio is influenced by the raw material F ratio (or the melting temperature). In other words, the $O^{2-}/P^{5+}$ ratio in the product glass can be controlled by the raw material F ratio (or the melting temperature).

The aforementioned concept is summarized to obtain the [knowledge 2].

The [knowledge 3] can be obtained by examining the [knowledge 2] from a completely different point of view. Namely, it is estimated that in the [knowledge 2], the P/O ratio is finally close to the $O^{2-}/P^{5+}$ ratio (about 3.3), which shows that even if the fluorophosphates glass finally has the composition of the $O^{2-}/P^{5+}$ ratio=3.5 (pyrophosphoric acid structure), the composition of the fluorophosphates glass in which the $O^{2-}/P^{5+}$ ratio=3.3 (Tripoli phosphorus structure) is a stable structure as an intermediate stage, and therefore the optical characteristics, etc., are hardly varied in accordance with a variation of production conditions. Based on such estimation, the [knowledge 3] can be obtained.

Based on the knowledge [knowledge 1] to [knowledge 3], the following examination is performed by the inventors of the present invention, to thereby obtain the fluorophosphates glass not substantially absorbing the visible light even if the near-infrared light is absorbed, by containing $Cu^{2+}$.

Whether or not $Cu^{2+}$ can be contained, is influenced by the $O^{2-}/P^{5+}$ ratio. The $O^{2-}/P^{5+}$ ratio is influenced by the raw material F ratio and the melting temperature. Such an influence is caused by the volatilization of a substance that exists in the raw material stage. Accordingly, it can be considered that the aforementioned influence can be solved and the fluorophosphates glass after production surely has the $O^{2-}/P^{5+}$ ratio that allows a suitable content of $Cu^{2+}$ to be charged, by setting the raw material F ratio to be low to such a degree unabling the volatilization to occur, and preventing O and P from desorbing from the raw materials. In this way, the volatilization does not occur substantially, and therefore the raw material F ratio is substantially the same as the $F^-$ ratio in the glass after production. Further, the raw material O/P ratio is also substantially the same as the $O^{2-}/P^{5+}$ ratio in the glass after production.

Regarding the $F^-$ ratio, the $O^{2-}/P^{5+}$ ratio is set to be higher than conventional, and the $F^-$ ratio is more decreased than that of patent documents 2 to 6 while having a sufficient weather resistant property. Such a concept is counter to a common sense of a skilled person. As described above, coupling of O and P is cut in the P—O—P chain by increasing the $O^{2-}/P^{5+}$ ratio, thus posing a problem that the intensity of the glass is reduced, and the weather-resistant property is deteriorated. Further, other metal in the glass and the pyrophosphoric acid structure are coupled to each other, thus posing a problem that the crystal is formed. In order to prevent these problems, it is a common sense that the $F^-$ ratio in the glass is increased.

However, the inventors of the present invention attempt to decrease the raw material F ratio and the $F^-$ ratio in the glass, irrespective of such a common sense. Further, examination is performed to the $F^-$ ratio and the $O^{2-}/P^{5+}$ ratio by the inventors of the present invention, so that the $O^{2-}/P^{5+}$ ratio is set to a suitable value while being set to be higher than conventional, to allow a suitable content of $Cu^{2+}$ to be added. As an example of a specific numerical value, based on the [knowledge 3], examination is performed to a technique of setting the raw material F ratio and the $F^-$ ratio to be extremely smaller than conventional, for the purpose of setting the $O^{2-}/P^{5+}$ ratio in the vicinity of 3.3 (in other words, 3.3 or a value within a range of a specific width, with a value close to 3.3 as a center value).

Note that strenuous efforts are made by the inventors of the present invention, regarding the melting temperature, the raw material F ratio and the $F^-$ ratio at this melting temperature, and a degree of the volatilization at these ratios.

The aforementioned patent document 12 surely describes a matter that the $O^{2-}/P^{5+}$ ratio is set to 3.4 or more, and the $F^-$ ratio is set to 0.05 or more. However, patent document 12 neither discloses nor suggests the [knowledge 1] to [knowledge 3], and there is no description in patent document 12, regarding a subject of the absorption ability of the light in the visible light region and the absorption ability of the light in the near-infrared region, when $Cu^{2+}$ is added. As a proof thereof, reduction of the transmittance (λ50=615 nm) in the near-infrared region (1200 nm) is not more than about 23% in examples of the patent document 12.

SUMMARY OF THE INVENTION

Preferred aspects of the present invention based on the above-descried knowledge and examination results are as follows.

According to a first aspect of the present invention, there is provided a fluorophosphates glass capable of absorbing a near-infrared light by containing $Cu^{2+}$, wherein a molar ratio of a content of $O^{2-}$ with respect to a content of $P^{5+}$ ($O^{2-}/P^{5+}$) in the fluorophosphates glass, is 3.2 or more and less than 3.4, and a molar ratio of a content of $F^-$ with respect to a total content of $O^{2-}$ and $F^-$ ($F^-/(O^{2-}+F^-)$) in the fluorophosphates glass is 0.05 or more and 0.25 or less, wherein the fluorophosphates glass does not contain $B^{3+}$, Pb, and ion and a compound thereof, and Tl and ion and a compound thereof.

According to a second aspect of the present invention, there is provided the fluorophosphates glass of the first aspect, wherein a ratio of a rare earth ion content with respect to a content of all cationic components in the fluorophosphates glass is 0.5 cation % or more and 2.0 cation % or less.

According to a third aspect of the present invention, there is provided the fluorophosphates glass of the first aspect or the second aspect, having a spectral transmission factor in which a transmittance at a wavelength of 1200 nm is less than 15% in a case of having a thickness showing 50% transmittance at a wavelength of 615 nm.

According to a fourth aspect of the present invention, there is provided a near-infrared light absorbing filter using the fluorophosphates glass of any one of the first to third aspects.

According to a fifth aspect of the present invention, there is provided a method for producing a fluorophosphates glass, which is the fluorophosphates glass fabricated by mixing glass raw materials and melting the glass raw materials, and capable of absorbing a near-infrared light by containing $Cu^{2+}$, the method comprising:

setting a composition of the fluorophosphates glass so that a molar ratio of a content of $O^{2-}$ with respect to a content of $P^{5+}$ ($O^{2-}/P^{5+}$) in the fluorophosphates glass is 3.2 or more and less than 3.4, and a ratio of a content of $F^-$ with respect to a total content of $O^{2-}$ and $F^-$ ($F^-/(O^{2-}+F^-)$) in the fluorophosphates glass is 0.05 or more and 0.25 or less;

mixing the glass raw materials based on the set composition; and producing a glass, wherein the fluorophosphates glass does not contain $B^{3+}$, Pb, and ion and a compound thereof, and Tl, and ion and a compound thereof.

According to a sixth aspect of the present invention, there is provided the method for producing a fluorophosphates glass of the fifth aspect, wherein the glass raw materials contain at least fluorine, oxygen, and phosphorus, the method including:

mixing the glass raw materials so that a molar ratio of a content of oxygen with respect to a content of phosphorus contained in the glass raw materials is 3.2 or more and less than 3.4, mixing the glass raw materials so that a molar ratio of a content of fluorine with respect to a total content of oxygen and fluorine contained in the glass raw materials is 0.05 or more and 0.25 or less; and producing a glass.

According to a seventh aspect of the present invention, there is provided the method for producing the fluorophosphates glass of the fifth or sixth aspects, wherein a ratio of a content of rare earth ions with respect to a content of all cationic components in the fluorophosphates glass is set to 0.5 cation % or more and 2.0 cation % or less, and a melting temperature is set to 1000° C. or less.

According to an eighth aspect of the present invention, there is provided the method for producing a fluorophosphates glass of any one of the fifth to seventh aspects, wherein the fluorophosphates glass has a spectral transmission factor in which a transmittance at a wavelength of 1200 nm is less than 15% in a case of having a thickness showing 50% transmittance at a wavelength of 615 nm.

According to the present invention, there are provided the fluorophosphates glass having an $O^{2-}/P^{5+}$ ratio even after production, which is set so that $Cu^{2+}$ can be added with a quantity of such a degree suppressing an absorption of a visible light while absorbing a near-infrared light and having a weather-resistant property, and the method for producing the same and the near-infrared light absorbing filter.

BRIEF DESCRIPTION OF THE DRAWINGS

FIG. 1 is a view in which numerical values of an $O^{2-}/P^{5+}$ ratio exceeding 3.0, or less than 3.5 are selected in examples of patent documents 2 to 6, and the $O^{2-}/P^{5+}$ ratio and the $F^-$ ratio are listed in a table.

FIG. 4A is a graph in which an absorption spectrum is multiplied by a coefficient so that a transmittance of a product glass at a wavelength of 1200 nm (about 8300K) is 10% of that of the graph of FIG. 3A, in which each of the large and small spectra is multiplied by 1.22, corresponding to a product glass having 1.22 times thickness, and FIG. 4B is a graph in which the absorption spectrum is multiplied by a coefficient so that a transmittance of the product glass at a wavelength of 1200 nm (about 8300K) is 10% of that of the graph of FIG. 3B, in which each of the large and small spectra is multiplied by 1.4, corresponding to a product glass having 1.4 times thickness.

FIG. 5A is a graph of a conversion of FIG. 4A, in which wavelength (nm) is taken on the horizontal axis, and a transmittance (%) is taken on the vertical axis, and FIG. 5B is a graph of a conversion of FIG. 4B, in which the wavelength (nm) is taken on the horizontal axis, and the transmittance (%) is taken on the vertical axis.

DETAILED DESCRIPTION OF THE INVENTION

Figure 2:
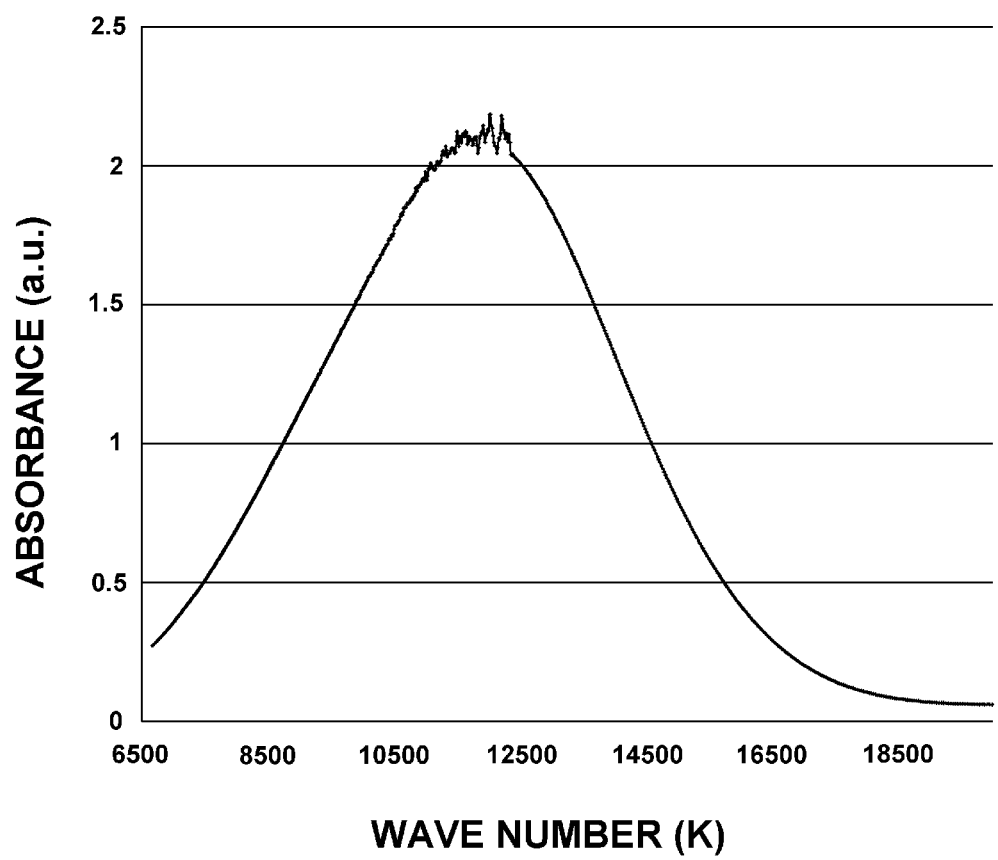
FIG. 2 is a graph of a result of a measurement of a transmittance spectrum in a wavelength range of 500 nm to 1500 nm, performed to a product glass having the $O^{2-}/P^{5+}$ ratio=3.5 (comparative example 1), in which a wave number is taken on the horizontal axis (K namely $cm^{-1}$), and an absorbance (arbitrary unit) is taken on the vertical axis.
Figure 3:
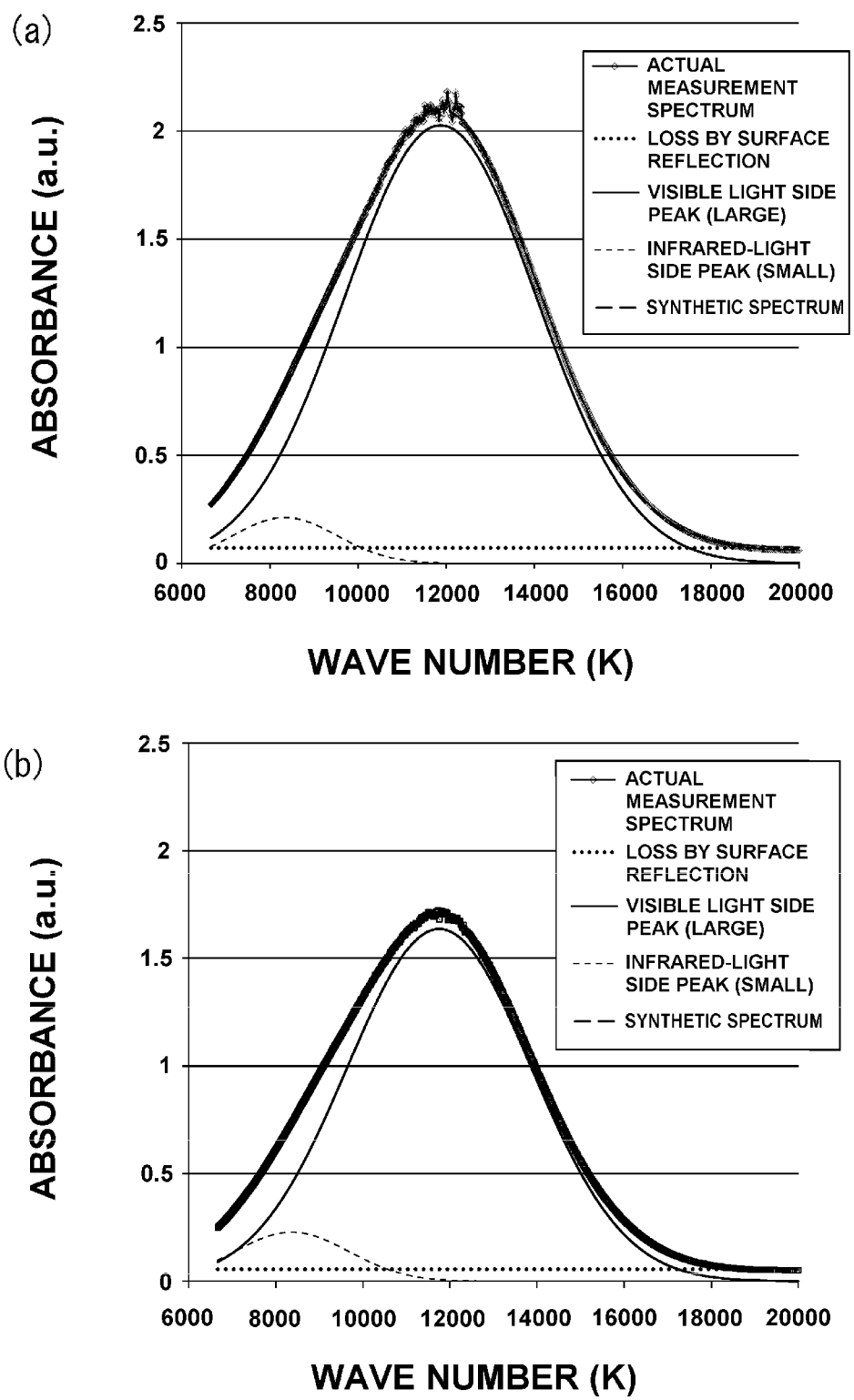
FIG. 3A is a graph in which an infrared-light side peak and a visible light side peak are separated when the $O^{2-}/P^{5+}$ ratio is high (namely, $O^{2-}/P^{5+}$ ratio=3.5 (comparative example 1))
FIG. 3B is a graph in which the infrared light side peak and the visible light side peak are separated when the $O^{2-}/P^{5+}$ ratio is low (namely, $O^{2-}/P^{5+}$ ratio=3.18 (reference example 1)).

Embodiments of the present invention will be descried in the following order.
1. A method for producing a fluorophosphates glass
2. A fluorophosphates glass
3. Effect by embodiments
4. Others

1. A Method for Producing a Fluorophosphates Glass

The fluorophosphates glass according to this embodiment is fabricated by mixing glass raw materials and melting the glass raw materials. Then, the fluorophosphates glass has an ability of absorbing a near-infrared light by containing $Cu^{2+}$.

In fabricating the fluorophosphates glass, a composition of the fluorophosphates glass in a product glass stage is set, so that a molar ratio of a content of $O^{2-}$ with respect to a content of $P^{5+}$ ($O^{2-}/P^{5+}$, namely $O^{2-}/P^{5+}$ ratio) in the fluorophosphates glass is 3.2 or more and less than 3.4, and a molar ratio of a content of $F^-$ with respect to a total content of $O^{2-}$ and $F^-$ ($F^-/(O^2+F^-$, namely $F^-$ ratio) in the fluorophosphates glass is 0.05 or more and 0.25 or less, and based on the set composition, the glass raw materials are mixed.

As described in the above-described [knowledge 1] to [knowledge 3], according to this embodiment, a volatile matter ($POF_3$) is substantially not allowed to be generated. By substantially not allowing the volatile matter to be generated, a main variation factor of the composition in a glass is eliminated in a period from a stage of mixing the glass raw materials to a stage of turning the glass raw materials into a product glass through melting. Therefore, in order to obtain the product glass having the aforementioned composition, the glass raw materials having similar compositions may be used.

Therefore, preferably the glass raw materials contain at least fluorine, oxygen, and phosphorus, having the compositions in the product glass stage satisfying the aforementioned condition, and also satisfying the following condition. Namely, the glass raw materials may be mixed so that the molar ratio of the content of oxygen with respect to phosphorus (O/P, namely raw material O/P ratio) contained in the glass raw materials is 3.2 or more and less than 3.4, and the molar ratio of a content F of fluorine with respect to a total content of oxygen and fluorine (F/(O+F), namely raw material F ratio) contained in the glass raw materials is 0.05 or more and 0.25 or less.

Here, when the $O^{2-}/P^{5+}$ ratio and the raw material O/P ratio are 3.2 or more, a P—O—P chain can be suitably cut in advance, and therefore generation of the volatile matter at the time of melting the glass raw materials can be sufficiently suppressed. Further, cut of the P—O—P chain by water molecules can be suppressed, and therefore a sufficient weather-resistant property can be provided to the product glass.

Further, a numerical value of 3.2 is a value in the vicinity of a value of $O^{2-}/P^{5+}$ ratio=3.3 obtained by [knowledge 3], and therefore the volatile matter is substantially not allowed to be generated, and has a relatively stable tripoli phosphorus structure, thus increasing a stability as the product glass.

Here, when the $O^{2-}/P^{5+}$ ratio and the raw material O/P ratio are less than 3.4, as described in [knowledge 1], a visible light absorption ability can be suppressed from being excessively exhibited, even if $Cu^{2+}$ is contained in the product glass to obtain a desired near-infrared light absorption ability. Further at this time, color generation (coloring) at the time of adding $Cu^{2+}$ can also be suppressed.

Meanwhile, when the F ratio and the raw material F ratio are 0.05 or more, a sufficient content of F can be interposed between pyrophosphoric acid structures (or Tripoli phosphorus acid structures), even if the $O^{2-}/P^{5+}$ ratio and the raw material O/P ratio are large values such as little less than 3.4, thus making it possible to secure a coupling between structures in which the P—O—P chain is cut. As a result, crystallization due to cut of the P—O—P chain can be sufficiently prevented, and a sufficient weather-resistant property can be provided to the product glass.

Further, when the $F^-$ ratio and the raw material F ratio are 0.25 or less, as described in [knowledge 2], the volatile matter is not allowed to be generated at a low temperature at which at least the glass raw materials can be melted. Moreover, a content of oxygen relative to fluorine is not allowed to be excessively increased, and as a result, the $O^{2-}/P^{5+}$ ratio and the raw material O/P ratio can be suitably maintained to be high so that substantial generation of the volatile matter can be suppressed. As a result, a main variation factor of the composition in a glass is eliminated in a period from a stage of mixing the glass raw materials to a stage of turning the glass raw materials into the product glass through melting. Thus, the $O^{2-}/P^{5+}$ ratio in the product glass can be controlled to have a desired near-infrared light absorption ability.

In conclusion, the $O^{2-}/P^{5+}$ ratio should be focused from the first, such as the $O^{2-}/P^{5+}$ ratio for not allowing the visible light to be excessively absorbed even if $Cu^{2+}$ is moderately added ([knowledge 1]), and a value close to $O^{2-}/P^{5+}$ ratio=3.3 for obtaining a relatively stable tripoli phosphorus structure ([knowledge 3]). Then, by setting the raw material F ratio ($F^-$ ratio) in the aforementioned range so that the product glass has such a value ($O^{2-}/P^{5+}$ ratio), the generation of the volatile substance is substantially eliminated and the variation factor of a main composition is solved ([knowledge 2]).

As described above, owing to an existence of [knowledge 1] to [knowledge 3], the following structure can be derived: namely, the $O^{2-}/P^{5+}$ ratio and the raw material O/P ratio are set to 3.2 or more and less than 3.4, and simultaneously the raw material $F^-$ ratio and the raw material F ratio are set to 0.05 or more and 0.25 or less. Namely, although each numerical value range has a meaning by itself, according to this embodiment, a merit can be exhibited by combining both numerical value ranges. Namely a glass composition can be simultaneously settled within both numerical value ranges, and therefore $Cu^{2+}$ can be added to the fluorophosphates glass, with a quantity of such a degree enabling to "suppress coloring" and "suppress absorption of the visible light" while "absorbing the near-infrared light", and the fluorophosphates glass capable of "controlling the set $O^{2-}/P^{5+}$ ratio in the glass raw material stage", and "exhibiting a plurality of effects such as "providing the weather-resistant property", can be obtained.

Although details are descried later in <2. Fluorophosphates glass>, the ratio of a content of the rare earth ions with respect to a content of all cationic components in the fluorophosphates glass may be set to 0.5 cation % or more and 2.0 cation % or less. Thus, the melting temperature can be decreased, thus facilitating a production step. When the content of the rare earth ions are set in the aforementioned range, the melting temperature can be set to 1000° C. or less, and therefore it is preferable to melt the glass raw material at this temperature.

The content of the cationic components or the total content thereof is indicated by cation % or simply by %, and the content of anionic components is indicated by anion % or simply by %, unless otherwise specified.

As described above, explanation is given for the glass raw materials and the composition of the product glass after production. However, in a specific step such as melting in the method for producing a fluorophosphates glass, a method used conventionally such as cast, pipe flow, roll, and press, may be used. A specific example of this step is given in <4. Others>.

When the aforementioned conventional method is used, preferably the glass is produced without substantially allowing the molar ratio to be varied, by mixing the glass raw materials based on the set composition and enclosing an exhaust gas in a closing system, and melting the glass raw materials in this state. According to this embodiment, the volatile matter is substantially not allowed to be generated. However, in order to solve the composition variation factor as much as possible, preferably the product glass is produced by melting and cooing the glass raw materials in a sealed vessel in which the exhaust gas can be enclosed.

2. Fluorophosphates Glass

As described above, the fluorophosphates glass produced by the above-described method, has approximately the same composition as the composition in the glass raw material stage. As a result, the fluorophosphates glass of this embodiment, has the molar ratio of the content of $O^{2-}$ with respect to the content of $P^{5+}$ ($O^{2-}/P^{5+}$) in the fluorophosphates glass being 3.2 or more and less than 3.4, and the molar ratio of the content of $F^-$ with respect to the total content of $O^{2-}$ and $F^-$ in the fluorophosphates glass ($F^-/(O^{2-}+F^-)$) being 0.05 or more and 0.25 or less, while having the ability of absorbing the near-infrared light by containing $Cu^{2+}$.

Figure 6:
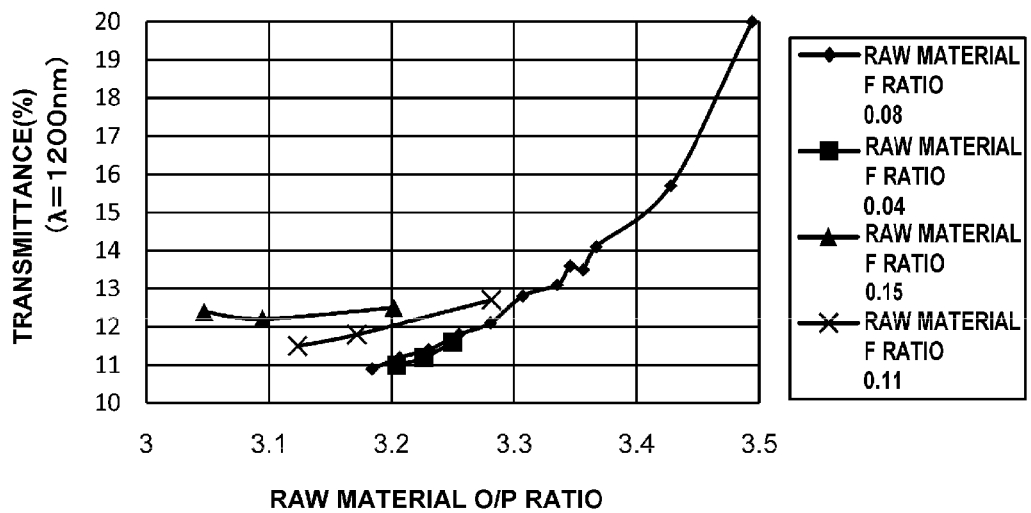
FIG. 6 is a graph in which the transmittance at a wavelength of 1200 nm is taken on the vertical axis, and a raw material O/P ratio is taken on the horizontal axis in a case of adjusting a thickness of the product glass so that the transmittance at a wavelength of 615 nm is 50%, and each raw material F is plotted.
Figure 7:
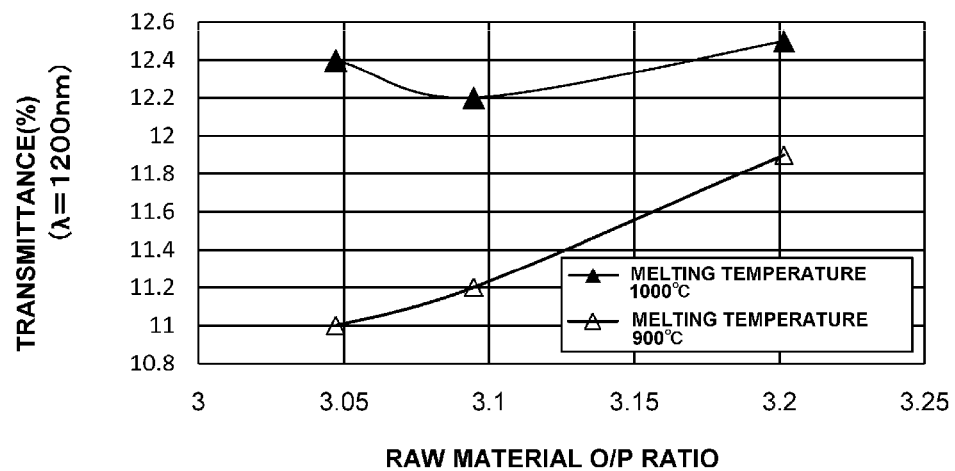
FIG. 7 is a graph in which the transmittance at a wavelength of 1200 nm is taken on the vertical axis, and the raw material O/P ratio is taken on the horizontal axis in a case of adjusting the thickness of the product glass so that the transmittance at the wavelength of 615 nm is 50%, and each melting temperature is plotted.

Further, regarding the spectral transmission factor of the fluorophosphates glass, particularly preferably, the fluorophosphates glass of this embodiment has the transmittance of less than 15% at the wavelength of 1200 nm, in a case of having a thickness showing 50% transmittance at a wavelength of 615 nm. Note that the numerical value of less than 15% is derived from a fact that the transmittance is less than 15% when the raw material O/P ratio is 3.4, in a plot of FIG. 6 in which the raw material F ratio is 0.08.

When the glass raw materials and the composition of the product glass satisfies the above-described composition, the fluorophosphates glass capable of suppressing the absorption ability in the visible light region and allowing the visible light to be transmitted while having a sufficient absorption ability in the near-infrared region, can be obtained. This is clarified by comparing the transmittance of the fluorophosphates glass of this example as will be described later (table 1), and the transmittance of table 1 of patent document 12, in which the transmittance of this example in the near-infrared region is lowered to about half in the near-infrared region (namely, nearly double near-infrared light can be absorbed). Namely, such a result is obtained because the fluorophosphates glass satisfying above-described condition can be obtained, and $Cu^{2+}$ can be added with a quantity of such a degree enabling the near-infrared light to be absorbed while suppressing the absorption of the visible light.

Further, the ratio of the content of the rare earth ions with respect to the content of all cationic components in the fluorophosphates glass is preferably set to 0.5 cation % or more and 2.0 cation % or less.

When the content of the rare earth ions contained as the cationic components is in the aforementioned range, increase of the temperature for melting the glass raw materials, and increase of a liquid phase temperature, a flow temperature and a molding temperature of a molten glass, can be suppressed to a moderate temperature. According to this embodiment, by setting the $O^{2-}/P^{5+}$ ratio and the raw material O/P ratio to 3.2 or more and less than 3.4 (further, by setting the $F^-$ ratio and the raw material F ratio to 0.05 or more and 0.25 or less), the generation of the volatile matter can be substantially suppressed, and the weather-resistant property of the product glass can be surely secured. In addition, by suppressing the increase of the melting temperature, the liquid phase temperature, and the molding temperature, the weather-resistant property of the product glass can be further secured while substantially suppressing the generation of the volatile matter.

Further, when the flow temperature and the molding temperature are decreased in a glass having a high liquid phase temperature, the viscosity of the glass becomes high during flow or molding of the glass, thus making it difficult to separate a molten glass gob and a molten glass drip from the molten glass, or making it difficult to mold the glass.

Meanwhile, any one kind or more of Y, La, Gd, and Yb is preferably introduced when the rare earth ions are introduced to the fluorophosphates glass, from a viewpoint of not coloring the glass and increasing a refractive index without significantly reducing a thermal stability.

For the reason described above, the total content of the rare earth ions are preferably set to 0.5 cation % or more and 2.0 cation % or less. Further, the total content including $Y^{3+}$, $La^{3+}$, $Gd^{3+}$, and $Yb^{3+}$ is preferably set to 0.5 cation % or more and less than 2.0 cation %. Particularly, Y has an excellent effect of increasing the refractive index while maintaining the thermal stability, and therefore the total content including $Y^{3+}$ is preferably set to 0.5 cation % or more and 2.0 cation % or less.

The composition of the fluorophosphates glass of this embodiment satisfying the above-described condition (the numerical value range of the $O^{2-}/P^{5+}$ ratio and the raw material O/P ratio, and the $F^-$ ratio and the raw material F ratio), is displayed by cation % display and is given as follows as an example of the fluorophosphates glass:

$P^{5+}$ 3 to 50%
$Al^{3+}$ 5 to 40%
$Li^+$ 0 to 30%
$Na^+$ 0 to 20%
$K^+$ 0 to 20%
$Mg^{2+}$ 0 to 10%
$Ca^{2+}$ 0 to 30%
$Sr^{2+}$ 0 to 30%
$Ba^{2+}$ 0 to 40%
wherein the total content of $Mg^{2+}$, $Ca^{2+}$, $Sr^{2+}$, and $Ba^{2+}$ contains 10% or more of
$Zn^{2+}$ 0 to 20%
$In^{2+}$ 0 to 20%
$Y^{3+}$ 0 to 10%
$La^{3+}$ 0 to 10%
$Gd^{3+}$ 0 to 10%
$Yb^{3+}$ 0 to 10%
$Cu^{2+}$ 0.5 to 13%,
and contains
$F^-$ 20 to 95%
$O^{2-}$ 5 to 80%
by anion % display.

Each composition will be described hereafter.

$P^{5+}$ is an important component that acts as a network forming component in the glass, and is one of the factors of deciding the $O^{2-}/P^{5+}$ ratio which is a characteristic part of this embodiment. Basically, it is preferable to set the content of $P^{5+}$ within a range of the $O^{2-}/P^{5+}$ ratio, and a value of 3% or more can be given as an example to produce a stable fluorophosphates glass. Further, in a case that the content of $P^{5+}$ is 50% or less, required low dispersability can be obtained. Accordingly, the content of $P^{5+}$ is preferably set in a range of 3 to 50%.

$Al^{3+}$ is an important component for increasing stability of the fluorophosphates glass, and 5% or more content of $Al^{3+}$ makes the fluorophosphates glass stable. Further, 40% or less content of $Al^{3+}$ can secure the total content with other components, and produce a stable fluorophosphates glass simultaneously. Accordingly, the content of $Al^{3+}$ is preferably set in a range of 5 to 40%.

Alkali metals such as $Li^+$, $Na^+$, and $K^+$ are components reducing a viscosity of the glass and lowering a glass transition temperature, and facilitating the production of the glass. Therefore, preferably the content of $Li^+$ is set to 0 to 30%, and the content of $Na^+$ is set to 0 to 20%, and the content of $K^+$ is set to 0 to 20%. Since $Li^+$ has a large effect of increasing the stability in the alkali metals, 0.5% or more $Li^+$ is more preferably introduced, and 1% or more $Li^+$ is further preferably introduced, and 2% or more $Li^+$ is particularly preferably introduced.

Alkali earth metals such as $Mg^{2+}$, $Ca^{2+}$, $Sr^{2+}$, and $Ba^{2+}$ are components of increasing the stability of the glass and increasing the refractive index, and therefore by setting the total content thereof to 10% or more, the effect for stability can be increased. Note that $Mg^{2+}$ and $Ca^{2+}$ are useful components for improving devitrification-resistance and resistance and productivity. $Sr^{2+}$ and $Ba^{2+}$ are also useful components for improving the devitrification-resistance and meltability of the glass.

However, if a specific alkali earth component is excessively increased, a balance with other component is lost, and therefore the alkali earth metal components are preferably introduced equally, and at least two kinds or more of $Mg^{2+}$, $Ca^{2+}$, $Sr^{2+}$, and $Ba^{2+}$ are preferably introduced. Preferable content of each component is 0 to 10% for $Mg^{2+}$, 0 to 30% for $Ca^{2+}$, 0 to 30% for $Sr^{2+}$, and 0 to 40% for $Ba^{2+}$.

$Zn^{2+}$ and $In^{3+}$ have characteristics of being easily introduced into the glass similarly to the alkali earth metals, and an effect of improving the stability due to multi-components by introducing $Zn^{2+}$ and $In^{3+}$ can be expected. However, excessive introduction of $Zn^{2+}$ and $In^{3+}$ is not preferable. Therefore, an introduction amount of $Zn^{2+}$ and $In^{3+}$ is preferably 0 to 20% respectively, and particularly preferably $Zn^{2+}$ and $In^{3+}$ are not introduced.

Although rare earth elements such as $Y^{3+}$, $La^{3+}$, $Gd^{3+}$, and $Yb^{3+}$ are components of increasing the refractive index while maintaining the low dispersability of the glass, excessive introduction thereof causes increase of the melting temperature and decrease of the stability of the glass. Therefore, the content of each component is preferably set to 0 to 10%.

In this embodiment, $Cu^{2+}$ is added to the glass raw materials. By adding $Cu^{2+}$, near-infrared light absorption characteristics can be given to the product glass. In this embodiment, even when $Cu^{2+}$ is added to the raw materials with a quantity of such a degree enabling the near-infrared light to be absorbed, this is the content of $Cu^{2+}$ not allowing the light to be excessively absorbed in the visible light region. As described above, the addition amount of $Cu^{2+}$ is determined by the $O^{2-}/P^{5+}$ ratio and the raw material O/P ratio, and the $F^-$ ratio and the raw material F ratio. However, as an example of the numerical value of the content of $Cu^{2+}$, 0.5 to 13% external addition is preferable.

Note that the $Cu^{2+}$-containing glass is suitable as a color correcting filter material of a semiconductor imaging device such as CCD and CMOS. The addition amount of $Cu^{2+}$ may be suitably determined within the aforementioned range, in consideration of the thickness of the filter.

Anionic components and anionic additives will be described next. In the fluorophosphates glass according to this embodiment, $F^-$ and $O^{2-}$ are main anionic components. Basically, $F^-$ and $O^{2-}$ of amounts within the aforementioned $F^-$ ratio may be preferable, and more preferably 20 to 95% of $F^-$ and 5 to 80% of $O^{2-}$ are introduced as an example of the numerical values of $F^-$ and $O^{2-}$, to thereby realize a desired optical characteristic and an excellent weather-resistant property.

Further, by introducing a small amount of $Cl^-$, $Br^-$, and $I^-$, the fluorophosphates glass is hardly wet for platinum products such as a platinum vessel and a platinum nozzle used during production or flow of the glass. Therefore, the glass can be easily produced. However, excessive introduction of Cl—, Br—, and I— invites a variation in the refractive indexes and a generation of platinum foreign matters caused by volatilization of the component. Therefore, a total introduction amount is preferably set to 0 to 3%, and more preferably 0.1 to 3%.

In addition, according to this embodiment, in order to improve a quality of the fluorophosphates glass, the total content of $F^-$, $O^{2-}$, $Cl^-$, $Br^-$, and $I^-$ is preferably set to 98% or more, and more preferably set to 99% or more, and further preferably set to 100%.

In addition, according to this embodiment, $B^{3+}$ is not contained. Although $B^{3+}$ is originally the component of improving a durability of the glass, $B^{3+}$ is likely to be volatilized as a fluoride during melting of the glass raw materials. Therefore, $B^{3+}$ is not contained in the fluorophosphates glass of this embodiment.

In the same way as $B^{3+}$, there is a component not preferably contained in the fluorophosphates glass of this embodiment. Specifically, Pb, As, Cd, Cr, U, Th, Tl and ions and a compound thereof are preferably not contained in the fluorophosphates glass in consideration of a load on an environment. Note that at least Pb and Tl are not contained in the fluorophosphates glass of this embodiment.

3. Effect of Embodiments

The following effects can be exhibited by this embodiment.

Namely, the fluorophosphates glass can be obtained, which is capable of exhibiting a plurality of effects as follows: namely, $Cu^{2+}$ can be added to the fluorophosphates glass with a quantity of such a degree enabling "absorption of the near-infrared light", "suppressing coloring", and "suppressing the absorption of the visible light", and "the set the $O^{2-}/P^{5+}$ ratio can be controlled in the glass raw material stage", and "the weather-resistant property can be provided".

As a result, the fluorophosphates glass having the weather-resistant property and having the following $O^{2-}/P^{5+}$ ratio even after production can be obtained: the $O^{2-}/P^{5+}$ ratio being set so that $Cu^{2+}$ can be added with a quantity of such a degree suppressing the absorption of the visible light while absorbing the near-infrared light.

Further, even if the content of $Cu^{2+}$ is varied while maintaining a constant glass component ratio excluding $Cu^{2+}$, the aforementioned "absorbing the near-infrared light" and "suppressing the absorption of the visible light" can be made compatible. Accordingly, the thickness of the filter can be adjusted by adjusting the content of $Cu^{2+}$ while maintaining the constant glass component ratio excluding $Cu^{2+}$. The thickness of the filter can be made thin by increasing the content of $Cu^{2+}$, and the thickness of the filter can be made thick by decreasing the content of $Cu^{2+}$. Namely, according to the present invention, the glass material can be provided, which is capable of responding to a filter having various thicknesses while maintaining a constant glass component ratio excluding $Cu^{2+}$.

When the filter is produced using the glass having the same glass component ratio excluding $Cu^{2+}$ and having different content of $Cu^{2+}$, excellent molding and processing can be performed even if not changing a molding condition and a processing condition of the glass, because the glass composition is approximately the same.

4. Others

A specific example of the steps such as melting in the method for producing a fluorophosphates glass, will be described hereafter. At this time, explanation will be given for a case that a near-infrared absorbing filter is produced from the grass raw materials satisfying the aforementioned condition, as an example.

Further, explanation will be given for a case that [knowledge 1] to [knowledge 3] are used in addition to the aforementioned embodiment.

(A Specific Example of the Method for Producing a Fluorophosphates Glass)

First, the glass raw materials satisfying the aforementioned requirement are weighed and mixed, and thereafter are heated and melted in a heat-resistant crucible, for example in a platinum or platinum alloy crucible. Note that in this embodiment, the volatile matter is not substantially allowed to be generated. However, the crucible is preferably covered with a heat-resistant lid such as platinum, to suppress the volatilization.

Then, stirring and refining of the glass in a melting state are performed so that homogeneous glass melt without containing bubbles is flow-out and molded from a glass flowing nozzle made of any one of the platinum, platinum alloy, gold, and gold alloy.

During flow-out of the glass, a phenomenon of wet-rising of the glass melt to an outer peripheral surface from a tip end of a nozzle occurs, wherein the glass melt is flowed-out from the tip end of the nozzle, and an effect of preventing such a phenomenon can be obtained by at least one kind or more halogen components of $Cl^-$, $Br^-$, and $I^-$ contained in the glass melt. As a result, the wet-risen glass melt is degraded and is captured by the glass melt flowed-out after degradation, thus making it possible to reduce and prevent a defective phenomenon such as striae and denitrification.

Incidentally, in the near-infrared light absorbing filter, there is a necessity for maintaining a high transmittance of the visible light while improving a function of cutting the near-infrared light, to thereby constitute a compact imaging system including a semiconductor image sensor. From such a point of view, in a glass having a thickness at which an external transmittance is 50% at a wavelength of 615 nm, preferably at least a light at a wavelength of 500 nm is not substantially absorbed. Note that "substantially" called here includes a case that the light at this wavelength is not completely absorbed, and a case that even if such a light is absorbed, this is an absorption level of no problem practically.

Further, preferably the external transmittance at a wavelength of 400 nm is 80% or more. Regarding the absorption of the near-infrared light, the transmittance at a wavelength of 1200 nm is preferably less than 15%.

An example of fabricating the near-infrared light absorbing filter is as follows.

First, a refined homogeneous molten glass is melted to obtain the glass, and is flowed from a pipe and is flowed into a die, to thereby mold a large-sized glass block having a thick plate thickness. For example, the die is prepared, which is constituted of a flat and horizontal bottom face, and a pair of side walls opposed to each other with the bottom face interposed between them, and a weir board for closing one of the opening parts positioned between the pair of side walls, and the homogeneous molten glass is cast in this die from the platinum alloy pipe at a constant flow speed. The cast-in molten glass is spread in the die, and is molded into a plate-shaped glass controlled to have a specific width by the pair of side walls. The molded plate-shaped glass is continuously pulled-out from the opening part of the die. Here, molding conditions such as a shape and a dimension of the die and a flow-out speed of the molten glass are suitably set, so that the large-sized and thick glass block can be molded.

Note that the glass raw materials may be melted in an atmosphere of an inert gas and a dry gas such as a nitrogen gas, or may be melted in an air atmosphere. According to the present invention, a high quality fluorophosphates glass can be produced and supplied under no influence of a glass melting atmosphere.

The molded glass block is transferred to an annealing oven which is heated in advance to a temperature in the vicinity of a glass transition temperature, and is gradually cooled to a room temperature. Precise slicing, grinding, and abrasive machining are applied to the glass block with a strain removed by gradual cooling, to thereby obtain a glass plate with both faces optically polished. Although such a glass plate can also be used as the near-infrared light absorbing filter, the near-infrared light absorbing filter can also be made by sticking the glass plates together. A plate-shaped crystal with both faces optical polished, is stuck to one of the faces of the plate-shaped near-infrared light absorbing glass with both faces optically polished. Then, a plate-shaped optical glass with both faces optically polished and capable of transmitting a visible light, such as BK-7 (borosilicate optical glass), is stuck to one of the crystal faces. The near-infrared light absorbing filter has such a structure. However, it is also acceptable that one more plate-shaped optical glass (for example, BK-7) with both faces optically polished and capable of transmitting the visible light is stuck to one of the faces of the plate-shaped optical glass. An optical multilayer film is formed on the surface of the filter as needed.

As described above, explanation is given for a case that the glass block is processed into the glass plate. However, it is also acceptable that the glass block is ground and polished to fabricate a lens, or is processed into the other shape.

The near-infrared light absorbing glass of this embodiment is the fluorophosphates glass, having a low glass transition temperature, thus making it possible to mold an optical device such as a lens and a diffraction grating, without applying abrasive machining such as grinding and polishing to an optical functional face after molding, by precise press molding. For example, a molding face of a publicly-known press-molding die such as an extremely hard material is processed into an inverted shape of a face of an aspherical lens with high precision, to thereby fabricate an upper die and a lower die, and a glass pre-form made of the near-infrared light absorbing glass of this embodiment is heated and press-molded precisely, using the aforementioned upper and lower dies or a publicly-known drum die and an upper/lower guiding member as needed. Thus, the molding face is precisely transferred to a glass, so that the aspherical lens can be fabricated. Such an aspherical lens is also the near-infrared light absorbing filter of this embodiment. The aspherical lens thus obtained can constitute a part or the whole part of an optical system for forming an image of an object on a receiving face of a semiconductor image sensor, and capable of reducing the number of optical components in an imaging device and is effective for saving a space and reducing a cost.

The molding face of the press-molding die is processed into the inverted shape of the diffraction grating, to fabricate the upper die and the lower die, and similarly to the aforementioned method, the glass pre-form is press-molded precisely, to thereby obtain the near-infrared light absorbing filter with diffraction grating.

The near-infrared light absorbing filter with diffraction grating functions as an optical low-pass filter of a light incident on the semiconductor image sensor. Accordingly, since the near-infrared light absorbing filter and the optical low-pass filter can be made as one element, the number of optical components in the imaging device can be reduced, and the space can be saved and the cost can be reduced.

When the molding face of the press-molding die is processed precisely into an inverted shape of a groove of the diffraction grating while being processed into the inverted shape of the lens face (for example the face of the aspherical lens) and is press-molded precisely similarly to the aforementioned method, the near-infrared light absorbing filter having all of the near-infrared light absorption function, optical low-pass filter function, and lens function, can be fabricated.

A publicly-known release film may be formed on the face of the press-molding die as needed. Publicly-known conditions are used as the conditions of the precise press-molding, which may be suitably decided depending on a specific specification of a target near-infrared light absorbing filter.

Thus, by fabricating the near-infrared absorbing filter by precise press-molding, devices not suitable for a mass production by grinding and polishing, such as the aspherical lens, the optical low-pass filter with diffraction grating, and the aspherical lens including the diffraction grating that functions as the optical low-pass filter, can be produced with high productivity. Note that an optical multilayer film such as an anti-reflection film may be formed on the surface of the near-infrared absorbing filter as needed.

According to the near-infrared light absorbing filter of this embodiment, owing to a high transmittance of the visible light and a large absorption of the near-infrared light, color sensitivity correction of the semiconductor imaging device can be satisfactorily performed. Further, an optically highly homogeneous filter can be made.

Moreover, the near-infrared light absorbing filter of this embodiment can be applied to the imaging device in combination with the semiconductor image sensor. Note that the semiconductor image sensor is formed by mounting semiconductor imaging devices such as CCD and CMOS in a package, with a light receiving part covered with a translucent member. The near-infrared light absorbing filter may also be used as the translucent member, or the translucent member may be formed separately from the near-infrared light absorbing filter.

Note that the imaging device of this embodiment can also include a lens for forming the image of the object on the light receiving face of the semiconductor image sensor, or an optical element such as a prism.

Further, the aforementioned imaging device has the near-infrared absorbing filter having an excellent optical homogeneous property, a high transmittance of a visible region, and a large absorption of a near-infrared region mounted thereon, thus realizing the imaging device in which the color sensitivity correction is satisfactorily performed, and capable of obtaining an image with excellent quality.

In addition, according to this embodiment, it is a matter of course that the optical device (such as a lens) other than the near-infrared light absorbing filter can also be fabricated. In addition, this embodiment can also be applied to various glass products, and various modifications can also be allowed.

(Application Examples of [Knowledge 1] to [Knowledge 3])

In this embodiment, explanation is given for the fluorophosphates glass capable of absorbing the near-infrared light by containing $Cu^{2+}$. However, the present invention can also be applied in some cases, to a case that a near-infrared light absorption component excluding $Cu^{2+}$ (for example, above-described Al, In, Sn, W, and a compound such as an oxide of them) is added instead of $Cu^{2+}$, or in a case that they are simultaneously added. Namely, when a certain near-infrared light absorption component is added, a light absorption peak can be divided into two as described in the [knowledge 1], and if the light absorption peak is influenced by the $O^{2-}/P^{5+}$ ratio, there is a high possibility that the above-described problem occurs. Further, since the [knowledge 2] and the [knowledge 3] describe a content regarding the $O^{2-}/P^{5+}$ ratio and the $F^-$ ratio. Therefore, this embodiment can be highly possibly applied even when a component excluding $Cu^{2+}$ is added. Such a state is reflected on the following aspects which are supllementarily described in the end of this specification.

Further, even in a case of the $O^{2-}/P^{5+}$ ratio and the raw material O/P ratio, and the $F^-$ ratio and the raw material F ratio which are slightly deviated from the numerical value range described in this embodiment, there is also a possibility that the aforementioned effects can be exhibited. Such a state is also reflected on the following aspects which are supllementarily described in the end of this specification.

EXAMPLES

Next, the present invention is more specifically described, with reference to examples. Of course, the present invention is not limited to the following examples.

Examples 1 to 44

In order to obtain each glass composition of examples 1 to 44 shown in table 1, raw materials including phosphate such as zinc dihydrogenphosphate and fluoride such as sodium fluoride were mixed and charged into the platinum crucible, and the raw materials were heated and melted for 2 to 3 hours while being stirred at a melting temperature of 1000° C. in examples 1 to 11, 16 to 41, at a melting temperature of 900° C. in example 12, at a melting temperature of 950° C. in examples 42 to 44, then the melt raw materials were refined and homogenized, to thereby obtain a homogeneous glass melt. Thereafter, the glass melt, namely a molten glass was cast in a die, to thereby obtain forty-four kinds of fluorophosphates glass corresponding to examples 1 to 44. Note that in the aforementioned step, it was not difficult to produce a glass due to large quantity of generation of volatile components. Further, no separation of crystal and residual bubbles, foreign matters, and striae could be recognized inside of the obtained glass.

TABLE 1

| | | | A | | | | | | |
|---|---|---|---|---|---|---|---|---|---|
| | B | C | $P^{5+}$ (%) | $Al^{3+}$ (%) | $Mg^{2+}$ (%) | $Ca^{2}$ (%) | $Sr^{2}$ (%) | $Ba^{2+}$ (%) | $Li^{+}$ (%) |
| Ex. 1 | 3.367 | 0.0813 | 47.00 | 9.00 | 3.00 | 4.00 | 3.00 | 10.00 | |
| Ex. 2 | 3.356 | 0.0815 | 47.00 | 8.00 | 3.00 | 4.00 | 3.00 | 11.00 | |
| Ex. 3 | 3.346 | 0.0818 | 47.00 | 7.00 | 3.00 | 4.00 | 3.00 | 12.00 | |
| Ex. 4 | 3.335 | 0.0820 | 47.00 | 5.00 | 3.00 | 4.00 | 3.00 | 13.00 | |
| Ex. 5 | 3.307 | 0.0810 | 48.00 | 6.00 | 3.00 | 4.00 | 3.00 | 13.00 | |
| Ex. 6 | 3.281 | 0.0801 | 49.00 | 6.00 | 3.00 | 4.00 | 3.00 | 13.00 | |
| Ex. 7 | 3.255 | 0.0792 | 50.00 | 6.00 | 3.00 | 4.00 | 3.00 | 13.00 | |
| Ex. 8 | 3.230 | 0.0783 | 51.00 | 6.00 | 3.00 | 4.00 | 3.00 | 13.00 | |
| Ex. 9 | 3.207 | 0.0775 | 52.00 | 6.00 | 3.00 | 4.00 | 3.00 | 13.00 | |
| Ex. 10 | 3.202 | 0.1500 | 47.00 | 6.00 | 3.00 | 4.00 | 3.00 | 13.00 | |
| Ex. 11 | 3.281 | 0.1100 | 47.00 | 6.00 | 3.00 | 4.00 | 3.00 | 13.00 | |
| Ex. 12 | 3.202 | 0.1500 | 47.00 | 6.00 | 3.00 | 4.00 | 3.00 | 13.00 | |
| Ex. 13 | 3.307 | 0.0810 | 48.00 | 6.00 | 3.00 | 4.00 | 3.00 | 13.00 | 5.00 |
| Ex. 14 | 3.300 | 0.1316 | 45.00 | 6.00 | 3.00 | 4.00 | 3.00 | 13.00 | 5.00 |
| Ex. 15 | 3.202 | 0.1470 | 49.00 | 8.51 | 1.26 | 4.34 | 3.26 | 14.11 | |
| Ex. 16 | 3.202 | 0.1470 | 49.00 | 8.51 | 3.26 | 2.34 | 3.26 | 14.11 | |
| Ex. 17 | 3.202 | 0.1470 | 49.00 | 8.51 | 3.26 | 4.34 | 3.26 | 12.11 | |
| Ex. 18 | 3.212 | 0.0607 | 53.00 | 6.00 | 3.00 | 4.00 | 3.00 | 13.00 | |
| Ex. 19 | 3.300 | 0.1108 | 45.00 | 6.00 | 2.48 | 3.30 | 2.48 | 10.74 | 21.80 |
| Ex. 20 | 3.300 | 0.2091 | 41.00 | 6.44 | 3.22 | 4.29 | 3.22 | 13.95 | |
| Ex. 21 | 3.300 | 0.2091 | 41.00 | 6.44 | 3.22 | 4.29 | 3.22 | 13.95 | 24.14 |
| Ex. 22 | 3.300 | 0.2091 | 41.00 | 6.44 | 3.22 | 4.29 | 3.22 | 13.95 | 10.73 |
| Ex. 23 | 3.300 | 0.0540 | 49.00 | 5.56 | 2.78 | 3.71 | 2.78 | 12.05 | |
| Ex. 24 | 3.300 | 0.0540 | 49.00 | 5.56 | 2.78 | 3.71 | 2.78 | 12.05 | 9.27 |
| Ex. 25 | 3.300 | 0.1316 | 45.00 | 6.00 | 3.00 | 4.00 | 8.00 | 8.00 | 10.00 |
| Ex. 26 | 3.300 | 0.1533 | 45.00 | 9.00 | 11.23 | 3.74 | 2.81 | 3.74 | |
| Ex. 27 | 3.300 | 0.1008 | 45.00 | 2.00 | 13.03 | 4.34 | 3.26 | 4.34 | |
| Ex. 28 | 3.300 | 0.0928 | 45.00 | 1.00 | 13.29 | 4.43 | 3.32 | 4.43 | |
| Ex. 29 | 3.300 | 0.1366 | 45.00 | 6.00 | 11.00 | 4.00 | 3.00 | 4.00 | |
| Ex. 30 | 3.378 | 0.1290 | 43.48 | 5.41 | 11.59 | 3.86 | 2.90 | 3.86 | |
| Ex. 31 | 3.378 | 0.1289 | 43.48 | 5.80 | 11.59 | 3.86 | 2.90 | 3.86 | |
| Ex. 32 | 3.300 | 0.1403 | 45.00 | 6.00 | 11.08 | 3.69 | 2.77 | 3.69 | |
| Ex. 33 | 3.300 | 0.1312 | 45.00 | 6.00 | 12.00 | 4.00 | 3.00 | 4.00 | |
| Ex. 34 | 3.300 | 0.1309 | 45.00 | 6.00 | 12.00 | 4.00 | 3.00 | 4.00 | |
| Ex. 35 | 3.300 | 0.1314 | 45.00 | 6.00 | 12.00 | 4.00 | 3.00 | 4.00 | |
| Ex. 36 | 3.300 | 0.1314 | 45.00 | 6.00 | 12.00 | 4.00 | 3.00 | 4.00 | |
| Ex. 37 | 3.300 | 0.1312 | 45.00 | 6.00 | 12.00 | 4.00 | 3.00 | 4.00 | |
| Ex. 38 | 3.300 | 0.1311 | 45.00 | 6.00 | 12.00 | 4.00 | 3.00 | 4.00 | |
| Ex. 39 | 3.300 | 0.1311 | 45.00 | 6.00 | 12.00 | 4.00 | 3.00 | 4.00 | |
| Ex. 40 | 3.300 | 0.1310 | 45.00 | 6.00 | 12.00 | 4.00 | 3.00 | 4.00 | |
| Ex. 41 | 3.300 | 0.1309 | 45.00 | 6.00 | 12.00 | 4.00 | 3.00 | 4.00 | |
| Ex. 42 | 3.300 | 0.1316 | 45.0 | 6.00 | 9.65 | 3.22 | 2.41 | 3.22 | |
| Ex. 43 | 3.300 | 0.1316 | 45.0 | 6.00 | 8.61 | 2.87 | 2.15 | 2.87 | |
| Ex. 44 | 3.300 | 0.1316 | 45.0 | 6.00 | 7.04 | 2.35 | 1.76 | 2.35 | |
| Ref. Ex. 1 | 3.184 | 0.0766 | 53.00 | 6.00 | 3.00 | 4.00 | 3.00 | 13.00 | |
| Ref. Ex. 2 | 3.047 | 0.1500 | 53.00 | 6.00 | 3.00 | 4.00 | 3.00 | 13.00 | |
| Ref. Ex. 3 | 3.095 | 0.1500 | 51.00 | 6.00 | 3.00 | 4.00 | 3.00 | 13.00 | |
| Ref. Ex. 4 | 3.123 | 0.1099 | 53.00 | 6.00 | 3.00 | 4.00 | 3.00 | 13.00 | |
| Ref. Ex. 5 | 3.172 | 0.1100 | 51.00 | 6.00 | 3.00 | 4.00 | 3.00 | 13.00 | |
| Ref. Ex. 6 | 3.047 | 0.1500 | 53.00 | 6.00 | 3.00 | 4.00 | 3.00 | 13.00 | |
| Ref. Ex. 7 | 3.095 | 0.1500 | 51.00 | 6.00 | 3.00 | 4.00 | 3.00 | 13.00 | |
| Ref. Ex. 8 | 3.250 | 0.0391 | 53.00 | 6.00 | 3.00 | 4.00 | 3.00 | 13.00 | |
| Ref. Ex. 9 | 3.227 | 0.0386 | 54.00 | 6.00 | 3.00 | 4.00 | 3.00 | 13.00 | |
| Ref. Ex. 10 | 3.205 | 0.0382 | 55.00 | 6.00 | 3.00 | 4.00 | 3.00 | 13.00 | |
| Com. Ex. 1 | 3.494 | 0.0852 | 43.00 | 9.00 | 5.00 | 4.00 | 3.00 | 8.00 | |
| Com. Ex. 2 | 3.428 | 0.0832 | 45.00 | 9.00 | 4.00 | 4.00 | 3.00 | 9.00 | |
| Com. Ex. 3 | 3.300 | 0.1316 | 45.0 | 6.00 | 12.78 | 4.26 | 3.20 | 4.26 | |

| | A | | | | D | E | | | | |
|---|---|---|---|---|---|---|---|---|---|---|
| | $Na^{+}$ (%) | $Zn^{2+}$ (%) | $Y^{3+}$ (%) | $Cu^{2}$ (%) | | F | G1 | G2 | G3 | G4 |
| Ex. 1 | 20.50 | | 1.00 | 2.50 | 1000 | 0.47 | | | 50 | 14.1 |
| Ex. 2 | 20.50 | | 1.00 | 2.50 | 1000 | 0.48 | | | 50 | 13.5 |
| Ex. 3 | 20.50 | | 1.00 | 2.50 | 1000 | 0.51 | | | 50 | 13.6 |
| Ex. 4 | 20.50 | | 1.00 | 2.50 | 1000 | 0.51 | | | 50 | 13.1 |
| Ex. 5 | 19.50 | | 1.00 | 2.50 | 1000 | 0.55 | | | 50 | 12.8 |
| Ex. 6 | 18.50 | | 1.00 | 2.50 | 1000 | 0.56 | | | 50 | 12.1 |
| Ex. 7 | 17.50 | | 1.00 | 2.50 | 1000 | 0.56 | | | 50 | 11.8 |
| Ex. 8 | 16.50 | | 1.00 | 2.50 | 1000 | 0.58 | | | 50 | 11.4 |
| Ex. 9 | 15.50 | | 1.00 | 2.50 | 1000 | 0.58 | | | 50 | 11.2 |
| Ex. 10 | 20.50 | | 1.00 | 2.50 | 1000 | 0.59 | | | 50 | 12.5 |
| Ex. 11 | 20.50 | | 1.00 | 2.50 | 1000 | 0.55 | | | 50 | 12.7 |
| Ex. 12 | 20.50 | | 1.00 | 2.50 | 900 | 0.55 | | | 50 | 11.9 |
| Ex. 13 | 14.50 | | 1.00 | 2.50 | 1000 | 0.57 | 78.1 | 86.7 | 50 | 13.5 |
| Ex. 14 | 17.50 | | 1.00 | 2.50 | 1000 | 0.55 | 83.3 | 86.8 | 50 | 13.6 |

TABLE 1-continued

| | A | A' | B | C | D | F | G1 | G2 | G3 | G4 |
|---|---|---|---|---|---|---|---|---|---|---|
| Ex. 15 | 15.73 | | 1.09 | 2.71 | 1000 | 0.54 | 73.2 | 84.2 | 50 | 12.1 |
| Ex. 16 | 15.73 | | 1.09 | 2.71 | 1000 | 0.52 | 72.9 | 83.8 | 50 | 12.8 |
| Ex. 17 | 15.73 | | 1.09 | 2.71 | 1000 | 0.53 | 74.7 | 84.9 | 50 | 12.6 |
| Ex. 18 | 14.50 | | 1.00 | 2.50 | 1000 | 0.60 | 72.1 | 82.0 | 50 | 12.8 |
| Ex. 19 | | 4.70 | 1.00 | 2.50 | 1000 | 0.31 | 81.7 | 87.5 | 50 | 14.6 |
| Ex. 20 | 24.14 | | 1.07 | 2.68 | 1000 | 0.56 | 86.1 | 89.0 | 50 | 12.5 |
| Ex. 21 | | | 1.07 | 2.68 | 1000 | 0.57 | 86.0 | 88.7 | 50 | 13.3 |
| Ex. 22 | 13.41 | | 1.07 | 2.68 | 1000 | 0.59 | 86.9 | 89.3 | 50 | 13.7 |
| Ex. 23 | 20.86 | | 0.93 | 2.32 | 1000 | 0.52 | 79.1 | 83.0 | 50 | 13.8 |
| Ex. 24 | 11.59 | | 0.93 | 2.32 | 1000 | 0.58 | 84.8 | 87.6 | 50 | 13.2 |
| Ex. 25 | 12.50 | | 1.00 | 2.50 | 1000 | 0.59 | 84.4 | 87.8 | 50 | 12.7 |
| Ex. 26 | 21.05 | | 0.94 | 2.50 | 1000 | 0.50 | 82.8 | 87.1 | 50 | 14.5 |
| Ex. 27 | 24.44 | | 1.09 | 2.50 | 1000 | 0.45 | 83.8 | 88.2 | 50 | 14.8 |
| Ex. 28 | 24.92 | | 1.11 | 2.50 | 1000 | 0.47 | 82.9 | 87.6 | 50 | 14.8 |
| Ex. 29 | 22.50 | | 2.00 | 2.50 | 1000 | 0.49 | 82.9 | 87.3 | 50 | 14.8 |
| Ex. 30 | 21.74 | | 1.35 | 5.80 | 1000 | 0.20 | 75.3 | 85.1 | 50 | 14.9 |
| Ex. 31 | 21.74 | | 0.97 | 5.80 | 1000 | 0.21 | 73.8 | 84.7 | 50 | 13.6 |
| Ex. 32 | 20.77 | | 1.00 | 6.00 | 1000 | 0.22 | 77.9 | 86.3 | 50 | 12.8 |
| Ex. 33 | 22.50 | | 1.00 | 2.50 | 1000 | 0.49 | 83.6 | 88.1 | 50 | 14.4 |
| Ex. 34 | 22.50 | | 1.00 | 2.50 | 1000 | 0.48 | 82.2 | 87.5 | 50 | 14.7 |
| Ex. 35 | 22.50 | | 1.00 | 2.50 | 1000 | 0.48 | 83.8 | 88.2 | 50 | 14.9 |
| Ex. 36 | 22.50 | | 1.00 | 2.50 | 1000 | 0.48 | 83.4 | 87.7 | 50 | 14.9 |
| Ex. 37 | 22.50 | | 1.00 | 2.50 | 1000 | 0.48 | 84.2 | 88.4 | 50 | 14.4 |
| Ex. 38 | 22.50 | | 1.00 | 2.50 | 1000 | 0.49 | 83.6 | 88.2 | 50 | 14.4 |
| Ex. 39 | 22.50 | | 1.00 | 2.50 | 1000 | 0.48 | 82.6 | 87.8 | 50 | 14.5 |
| Ex. 40 | 22.50 | | 1.00 | 2.50 | 1000 | 0.48 | 82.2 | 87.6 | 50 | 14.8 |
| Ex. 41 | 22.50 | | 1.00 | 2.50 | 1000 | 0.49 | 82.6 | 87.6 | 50 | 14.5 |
| Ex. 42 | 22.50 | | 1.00 | 6.00 | 950 | 0.50 | 81.1 | 87.0 | 21 | 0.9 |
| Ex. 43 | 22.50 | | 1.00 | 9.00 | 950 | 0.50 | 76.6 | 84.9 | 10 | 0.1 |
| Ex. 44 | 22.50 | | 1.00 | 12.00 | 950 | 0.50 | 72.3 | 82.9 | 5 | 0.0 |
| Ref. Ex. 1 | 14.50 | | 1.00 | 2.50 | 1000 | 0.59 | | | 50 | 10.9 |
| Ref. Ex. 2 | 14.50 | | 1.00 | 2.50 | 1000 | 0.56 | | | 50 | 12.4 |
| Ref. Ex. 3 | 16.50 | | 1.00 | 2.50 | 1000 | 0.57 | | | 50 | 12.2 |
| Ref. Ex. 4 | 14.50 | | 1.00 | 2.50 | 1000 | 0.60 | | | 50 | 11.5 |
| Ref. Ex. 5 | 16.50 | | 1.00 | 2.50 | 1000 | 0.59 | | | 50 | 11.8 |
| Ref. Ex. 6 | 14.50 | | 1.00 | 2.50 | 900 | 0.58 | | | 50 | 11.0 |
| Ref. Ex. 7 | 16.50 | | 1.00 | 2.50 | 900 | 0.60 | | | 50 | 11.2 |
| Ref. Ex. 8 | 14.50 | | 1.00 | 2.50 | 1000 | 0.59 | | | 50 | 11.6 |
| Ref. Ex. 9 | 13.50 | | 1.00 | 2.50 | 1000 | 0.61 | | | 50 | 11.2 |
| Ref. Ex. 10 | 12.50 | | 1.00 | 2.50 | 1000 | 0.59 | | | 50 | 11.0 |
| Com. Ex. 1 | 24.50 | | 1.00 | 2.50 | 1000 | 0.36 | | | 50 | 20.0 |
| Com. Ex. 2 | 22.50 | | 1.00 | 2.50 | 1000 | 0.43 | | | 50 | 15.7 |
| Com. Ex. 3 | 22.50 | | 1.00 | 1.00 | 950 | 0.50 | 89.3 | 90.6 | 72 | 44.6 |

λ 50 = 582 nm in Ex. 42,
λ 50 = 569 nm in Ex. 43,
λ 50 = 561 nm in Ex. 44,
λ 50 = 665 nm in Com. Ex. 3
Ex. = Example
Ref. Ex. = Reference example
Com. Ex. = Comparative example
A = Glass composition
B = $O^{2-}/P^{5+}$ ratio
C = $F^{-}$ ratio
D = Melting temperature (° C.)
E = Transmittance characteristic (unit of transmittance: %)
F = Plate thickness (mm)
G1 = Transmittance (400 nm)
G2 = Transmittance (500 nm)
G3 = Transmittance (615 nm)
G4 = Transmittance (1200 nm)

Comparative Examples 1 to 2

In comparative examples 1 to 2, glass of the comparative examples in which the raw material O/P ratio (namely the $O^{2-}/P^{5+}$ ratio in the product glass) was 3.4 or more, was fabricated in comparison with examples 1 to 44. The other compositions were the same as those of table 1, and specific production steps were the same as those of examples.

Reference Examples 1 to 10

Examples of reducing the transmittance in the near-infrared light region while having the $O^{2-}/P^{5+}$ ratio outside of the numerical range of this embodiment, are shown as reference examples.

More specifically, the glass in which the raw material O/P ratio (namely the $O^{2-}/P^{5+}$ ratio in the product glass) was less than 3.2, was fabricated as reference examples 1 to 7. The compositions excluding the raw material O/P ratio were the same as those of table 1, and the melting temperature was set to 1000° C. in reference examples 1 to 5, and the melting temperature was set to 900° C. in reference examples 6 to 7, and the other specific production steps were the same as those of examples.

Further, the glass in which the raw material F ratio (namely, the $F^{-}$ ratio in the product glass) was less than 0.05, was fabricated as reference examples 8 to 10. The compositions excluding the raw material F ratio and a specific production steps were the same as those of table 1, and the other compositions were the same as those of table 1, and a specific production steps were the same as those of examples.

<Transmittance>

Regarding each glass of examples 1 to 44, comparative examples 1 to 2, and reference examples 1 to 10, table 1 shows the thickness where the external transmittance is 50% at a wavelength of 615 nm, and the external transmittance at a wavelength of 1200 nm in this thickness (transmittance at a wavelengths of 400 nm and 500 nm in several examples).

As shown in table 1, the glass of examples has a high transmittance in the visible light region, and has an excellent function of cutting the near-infrared light in examples and reference examples, and is suitable as a chromatic aberration correcting filter glass of the semiconductor image sensor.

In the fluorophosphates glass of this embodiment, the content of Cu2+ preferably exceeds 1.00%. In addition, the content of Cu2+ further preferably exceeds 2.50% or more in consideration of examples 1 to 44. Meanwhile, the content of Cu2+ is 5% or less for maintaining thermal stability of the glass.

Other preferable embodiments will be supplementarily described hereafter.

[Supplementary Description 1]

There is provided a fluorophosphates glass having a peak of light absorption in a near-infrared region by containing $Cu^{2+}$, wherein the peak is freely separated into two peaks, and the light with a wavelength of 500 nm is not substantially absorbed while substantially absorbing the light with a wavelength of 1200 nm without generating color by $Cu^{2+}$, and a value of such a degree not substantially generating $POF_3$ when producing the near-infrared light absorbing filter, is set as an upper limit of a range of a molar ratio of a content of $F^-$ with respect to a total content of $O^{2-}$ and $F^-$ ($F^-/(O^{2-}+F^-)$) value in the fluorophosphates glass, wherein the fluorophosphates glass does not contain $B^{3+}$, Pb, and ion and a compound thereof, and Tl and ion and a compound thereof.

[Supplementary Description 2]

There is provided a fluorophosphates glass capable of absorbing a near-infrared light by containing $Cu^{2+}$, wherein an $O^{2-}/P^{5+}$ ratio of such a degree not substantially generating $POF_3$ when producing the near-infrared light absorbing filter, is set as a lower limit of a range of the $O^{2-}/P^{5+}$ ratio being a molar ratio of a content of $O^{2-}$ with respect to a content of $P^{5+}$ ($O^{2-}/P^{5+}$) in the fluorophosphates glass, and the $O^{2-}/P^{5+}$ ratio at which $Cu^{2+}$ can be charged, is set as an upper limit thereof. $Cu^{2+}$ of such an amount not substantially absorbing the light with a wavelength of 500 nm while substantially absorbing a light with a wavelength of 1200 nm without generating color by $Cu^{2+}$, and a value of such a degree not substantially generating $POF_3$ when producing the near-infrared light absorbing filter, is set as an upper limit of a range of a molar ratio of a content of $F^-$ with respect to a total content of $O^2$ and $F^-$ ($F^-/(O^{2-}+F^-)$) in the fluorophosphates glass wherein the fluorophosphates glass does not contain $B^{3+}$, Pb, and ion and a compound thereof, and Tl and ion and a compound thereof.

[Supplementary Description 3]

There is provided a fluorophosphates glass capable of absorbing a near-infrared light by containing $Cu^{2+}$, wherein a molar ratio of a content of $O^{2-}$ with respect to a content of $P^{5+}$ ($O^{2-}/P^{5+}$) in the fluorophosphates glass is 3.05 or more and less than 3.40, and a molar ratio of a content of $F^-$ with respect to a total content of $O^{2-}$ and $F^-$ ($F^-/(O^{2-}+F^-)$) in the fluorophosphates glass is 0.03 or more and 0.19 or less, wherein the fluorophosphates glass does not contain $B^{3+}$, Pb, and ion and a compound thereof, and Tl and ion and a compound thereof.

[Supplementary Description 4]

There is provided a fluorophosphates glass, wherein a value of such a degree not generating a crystal due to $P_2O_7^{4-}$, is set as a lower limit of a ratio of the content of $F^-$.

[Supplementary Description 5]

There is provided a method for producing a fluorophosphates glass, which produces a fluorophosphates glass fabricated by mixing glass raw materials and melting the glass raw materials and capable of absorbing a near-infrared light by containing $Cu^{2+}$, the method comprising:

setting a $O^{2-}/P^{5+}$ ratio of such a degree not substantially generating $POF_3$ when producing the near-infrared absorbing filter, as a lower limit of a range of the $O^{2-}/P^{5+}$ ratio being a molar ratio of a content of $O^{2-}$ with respect to a content of $P^{5+}$ ($O^{2-}/P^{5+}$) in the fluorophosphates glass, and setting the $O^{2-}/P^{5+}$ ratio as an upper limit thereof at which $Cu^{2+}$ can be charged, with such a quantity not substantially absorbing a light with a wavelength of 500 nm without generating color by $Cu^{2+}$;

setting a value of such a degree not substantially generating $POF_3$ when producing the near-infrared light absorbing filter, as an upper limit of a range of a molar ratio ($F^-/(O^{2-}+F^-)$) of a content of $F^-$ with respect to a total content of $O^{2-}$ and $F^-$ in the fluorophosphates glass; and mixing glass raw materials based on the set composition and producing a glass, wherein the fluorophosphates glass does not contain B3+, Pb and ion and a compound thereof, and Tl and ion and a compound thereof.

[Supplementary Description 6]

There is provided a method for producing a fluorophosphates glass, which produces a fluorophosphates glass fabricated by mixing glass raw materials and melting the glass raw materials and capable of absorbing a near-infrared light by containing $Cu^{2+}$, the method comprising:

setting a $P^{2-}/P^{5+}$ ratio of such a degree not substantially generating $POF_3$ when producing the near-infrared light absorbing filter as a lower limit of a range of the $O^{2-}/P^{5+}$ ratio being a molar ratio of a content of $O^{2-}$ with respect to a content of $P^{5+}$ ($O^{2-}/P^{5+}$) in the fluorophosphates glass, and setting the $O^{2-}/P^{5+}$ ratio as an upper limit thereof at which $Cu^{2+}$ can be charged with an amount of not substantially absorbing a light with a wavelength of 500 nm while substantially absorbing a light with a wavelength of 1200 nm without generating color by $Cu^{2+}$; and mixing glass raw materials based on the set composition, and enclosing an exhaust gas in a closing system and melting the glass raw materials, to thereby produce a glass without substantially varying the molar ratio, wherein the fluorophosphates glass does not contain $B^{3+}$, Pb and ion and a compound thereof, and Tl and ion and a compound thereof.

[Supplementary Description 7]

There is provided a fluorophosphates glass capable of absorbing a near-infrared light by containing a near-infrared light absorption component, wherein a $O^{2-}/P^{5+}$ ratio of such a degree not substantially generating $POF_3$ when producing the fluorophosphates glass, is set as a lower limit of a range of the $O^{2-}/P^{5+}$ ratio being a molar ratio of a content of with respect to a content of $P^{5+}$ ($O^{2-}/P^{5+}$) in the fluorophosphates glass, and the $O^{2-}/P^{5+}$ ratio is set as an upper limit thereof, at which $Cu^{2+}$ can be charged with such an amount not substantially absorbing the light with a wavelength of 500 nm while substantially absorbing a light with a wavelength of 1200 nm without generating color by the near-infrared light absorption component, and a value of such a degree not substantially generating $POF_3$ when producing the near-infrared light absorbing filter, is set as an upper limit of a range of a molar ratio of a content of $F^-$ with respect to a total content of $O^{2-}$ and $F^-$ ($F^-/(O^{2-}+F^-)$) in the fluorophosphates glass, wherein the fluorophosphates glass does not contain $B^{3+}$, Pb, and ion and a compound thereof, and Tl and ion and a compound thereof.

What is claimed is:

1. A fluorophosphates glass capable of absorbing a near-infrared light by containing $Cu^{2+}$, wherein a molar ratio of a content of $O^{2-}$ with respect to a content of $P^{5+}$ ($O^{2-}/P^{5+}$) in the fluorophosphates glass, is 3.2 or more and less than 3.4, and a molar ratio of a content of $F^-$ with respect to a total content of $O^{2-}$ and $F^-$ ($F^-/(O^{2-}+F^-)$) in the fluorophosphates glass is 0.05 or more and 0.1533 or less, the fluorophosphates glass does not contain $B^{3+}$, Pb, Tl, ions thereof, and compounds thereof, a content of $Ba^{2+}$ in the fluorophosphates glass is 2.35 cation % or more and 13.95 cation % or less, and the fluorophosphates glass contains at least one kind selected from a group consisting of $Cl^-$, $Br^-$, and $I^-$.

2. The fluorophosphates glass according to claim 1, wherein a total content of $Y^{3+}$, $La^{3+}$, $Gd^{3+}$, and $Yb^{3+}$ with respect to a content of all cationic components in the fluorophosphates glass is 0.5 cation % or more and 2.0 cation % or less.

3. A near-infrared light absorbing filter using the fluorophosphates glass of claim 1.

4. The fluorophosphates glass according to claim 1, wherein the molar ratio of content of $F^-$ with respect to the total content of $O^{2-}$ and $F^-$ ($F^-/(O^{2-}+F^-)$) in the fluorophosphates glass is 0.0540 or more and 0.1500 or less.

5. The fluorophosphates glass according to claim 1, wherein a content of $Al^{3+}$ with respect to a content of all cationic components in the fluorophosphates glass is 1.00 cation % or more and 9.00 cation % or less.

6. The fluorophosphates glass according to claim 1, wherein a total content of $Cl^-$, $Br^-$, and $I^-$ in the fluorophosphates glass is from 0.1% to 3%.

7. A fluorophosphates glass capable of absorbing a near-infrared light by containing $Cu^{2+}$, wherein a molar ratio of a content of $O^{2-}$ with respect to a content of $P^{5+}$ ($O^{2-}/P^{5+}$) in the fluorophosphates glass, is 3.05 or more and less than 3.4, and a molar ratio of a content of $F^-$ with respect to a total content of $O^{2-}$ and $F^-$ ($F^-/(O^{2-}+F^-)$) in the fluorophosphates glass is 0.03 or more and 0.19 or less, the fluorophosphates glass does not contain $B^{3+}$, Pb, Tl, ions thereof, and compounds thereof, and a content of $Ba^{2+}$ in the fluorophosphates glass is 2.35 cation % or more and 13.95 cation % or less, and the fluorophosphates glass contains at least one kind selected from a group consisting of $Cl^-$, $Br^-$, and $I^-$.

8. The fluorophosphates glass according to claim 1, wherein a total content of $Cl^-$, $Br^-$, and $I^-$ in the fluorophosphates glass is from 0.1% to 3%.

* * * * *